US011210821B2

(12) United States Patent
Chalfin et al.

(10) Patent No.: US 11,210,821 B2
(45) Date of Patent: Dec. 28, 2021

(54) GRAPHICS PROCESSING SYSTEMS

(71) Applicant: Arm Limited, Cambridge (GB)

(72) Inventors: Alexander Eugene Chalfin, Mountain View, CA (US); Andreas Due Engh-Halstvedt, Trondheim (NO); Olof Henrik Uhrenholt, Lomma (SE); Andreas Loeve Selvik, San Mateo, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/698,030

(22) Filed: Nov. 27, 2019

(65) Prior Publication Data

US 2021/0158585 A1 May 27, 2021

(51) Int. Cl.
*G06T 15/00* (2011.01)
*G06T 1/20* (2006.01)
*G06T 11/20* (2006.01)
*G06T 7/60* (2017.01)
*G06T 7/11* (2017.01)

(52) U.S. Cl.
CPC .............. *G06T 11/20* (2013.01); *G06T 7/11* (2017.01); *G06T 7/60* (2013.01)

(58) Field of Classification Search
CPC ........................................................ G06T 7/11
USPC ........................................................ 345/441
See application file for complete search history.

(56) References Cited

U.S. PATENT DOCUMENTS 6,552,723 B1 * 4/2003 Duluk, Jr. ............. G06T 1/60
345/419

6,567,092 B1 * 5/2003 Bowen ...................... G06T 1/20
345/2.1
6,943,797 B2 * 9/2005 Wasserman ............... G06T 1/60
345/418
7,126,606 B2 * 10/2006 Beda ....................... G06T 11/60
345/473
7,439,979 B1 * 10/2008 Allen ....................... G06T 1/20
345/506

(Continued)

FOREIGN PATENT DOCUMENTS

WO 2009068895 6/2009

OTHER PUBLICATIONS

Isenberg, et al., "Compressing Polygon Mesh Geometry with Parallelogram Prediction," Visualization Conference, Dec. 2002 DOI: 10.1109/VISUAL.2002.1183768.

(Continued)

*Primary Examiner* — Javid A Amini
(74) *Attorney, Agent, or Firm* — Vierra Magen Marcus LLP

(57) ABSTRACT

When processing graphics primitives in a graphics processing system, the render output is divided into a plurality of regions for rendering, each region comprising a respective area of the render output. It is determined for which of the plurality of regions of the render output a primitive should be rendered for. For each region of the render output it is determined a primitive should be rendered for, geometry data for the primitive is stored in memory in a respective data structure for the region in a compressed form, such that the geometry data for the primitive to be rendered is stored in a compressed form, in a respective, different data structure for each different region of the render output it is determined the primitive should be rendered for.

19 Claims, 13 Drawing Sheets

Framebuffer Subregions

(56) References Cited

U.S. PATENT DOCUMENTS

| | | | | |
|---|---|---|---|---|
| 7,843,463 B1* | 11/2010 | Kilgard | ............. | G06T 15/04 345/584 |
| 7,852,340 B2* | 12/2010 | Bastos | ............. | G06T 15/005 345/505 |
| 7,928,988 B1 | 4/2011 | Levas | | |
| 7,978,205 B1* | 7/2011 | Patel | ............. | G06T 15/20 345/619 |
| 8,040,351 B1* | 10/2011 | Diard | ............. | G06T 17/00 345/426 |
| 8,207,975 B1* | 6/2012 | Molnar | ............. | G06T 15/005 345/506 |
| 9,208,605 B1* | 12/2015 | Everitt | ............. | G06T 15/50 |
| 9,830,741 B2* | 11/2017 | Kilgariff | ............. | G06T 15/80 |
| 2002/0126127 A1* | 9/2002 | Fox | ............. | G06T 15/506 345/581 |
| 2004/0012563 A1* | 1/2004 | Papakipos | ............. | G06T 1/20 345/157 |
| 2004/0130552 A1* | 7/2004 | Duluk, Jr. | ............. | G06T 15/005 345/506 |
| 2004/0263520 A1* | 12/2004 | Wasserman | ............. | H04N 19/42 345/506 |
| 2007/0257905 A1* | 11/2007 | French | ............. | G06T 15/005 345/419 |
| 2009/0174706 A1* | 7/2009 | Howson | ............. | G06T 11/40 345/419 |
| 2009/0295804 A1* | 12/2009 | Goel | ............. | G06T 15/005 345/426 |
| 2010/0177105 A1* | 7/2010 | Nystad | ............. | G06T 11/40 345/522 |
| 2012/0206653 A1 | 8/2012 | Graves et al. | | |
| 2013/0002663 A1* | 1/2013 | Howson | ............. | G06T 1/20 345/419 |
| 2015/0015593 A1 | 1/2015 | Chalfin | | |
| 2015/0310642 A1 | 10/2015 | Kruglick | | |
| 2015/0379658 A1 | 12/2015 | Gyota et al. | | |
| 2016/0203144 A1 | 7/2016 | Yao et al. | | |
| 2016/0217550 A1 | 7/2016 | Lu et al. | | |
| 2017/0124748 A1* | 5/2017 | Ellis | ............. | H04N 13/351 |
| 2017/0309027 A1* | 10/2017 | Kleen | ............. | G06T 15/005 |
| 2018/0130253 A1* | 5/2018 | Hazel | ............. | G06T 15/005 |
| 2018/0232912 A1* | 8/2018 | Nevraev | ............. | G06T 9/001 |
| 2018/0300915 A1* | 10/2018 | Heggelund | ............. | G06T 15/005 |
| 2019/0012829 A1* | 1/2019 | Engh-Halstvedt | ............. | G06T 1/60 |
| 2019/0243652 A9* | 8/2019 | Hakura | ............. | G06T 15/405 |
| 2020/0074713 A1* | 3/2020 | Schluessler | ............. | G06T 15/40 |
| 2020/0202484 A1* | 6/2020 | Brigg | ............. | G06T 11/40 |
| 2020/0334889 A1* | 10/2020 | Rollingson | ............. | G06T 15/005 |

OTHER PUBLICATIONS

Chalfin, et al., "Graphics Processing Systems," U.S. Appl. No. 16/697,903, filed Nov. 27, 2019.

Chalfin, et al., "Graphics Processing Systems," U.S. Appl. No. 16/697,942, filed Nov. 27, 2019.

Bratt, et al., "Graphics Processing Systems," U.S. Appl. No. 16/697,984, filed Nov. 27, 2019.

Non-Final Office Action dated Nov. 5, 2020, U.S. Appl. No. 16/697,942.

Response to Non-Final Office Action dated Mar. 4, 2021, U.S. Appl. No. 16/697,942.

Non-Final Office Action dated Dec. 2, 2020, U.S. Appl. No. 16/697,903.

Response to Non-Final Office Action dated Mar. 2, 2021, U.S. Appl. No. 16/697,903.

Non-Final Office Action dated Jan. 28, 2021, U.S. Appl. No. 16/697,984.

Combined Search and Examination Report dated Aug. 31, 2021, GB Patent Application No. 2018208.5.

Response to Final Office Action dated Sep. 27, 2021, U.S. Appl. No. 16/697,903.

Final Office Action dated Apr. 2, 2021, U.S. Appl. No. 16/697,942.

Final Office Action dated Apr. 28, 2021, U.S. Appl. No. 16/697,903.

Response to Non-Final Office Action dated Apr. 28, 2021, U.S. Appl. No. 16/697,984.

Response to Final Office Action dated Jun. 21, 2021, U.S. Appl. No. 16/697,942.

Notice of Allowance dated Aug. 2, 2021, U.S. Appl. No. 16/697,984.

Notice of Allowance dated Aug. 25, 2021, U.S. Appl. No. 16/697,942.

Notice of Allowance dated Oct. 22, 2021, U.S. Appl. No. 16/697,903.

* cited by examiner

GRAPHICS PROCESSING SYSTEMS

BACKGROUND

The technology described herein relates to computer graphics processing and in particular to the processing of graphics primitives during the rendering of an output.

Graphics processing is normally carried out by first dividing the graphics processing (render) output to be rendered, such as a frame to be displayed, into a number of similar basic components (so-called "primitives") to allow the graphics processing operations to be more easily carried out. These "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices. For a given frame, there may, e.g., be of the order of a few hundred draw calls and hundreds of thousands of primitives.

Once primitives and their vertices have been generated and defined, they can be processed by the graphics processing system, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically divided (by area) into regularly-sized and shaped rendering tiles (they are usually e.g., squares or rectangles). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for each rendering tile to be identified. This sorting allows primitives that need to be processed for a given rendering tile to be identified (so as to, e.g., avoid unnecessarily rendering primitives that are not actually present in a tile). The sorting process produces lists of primitives to be rendered for regions of the render output (commonly referred to as "primitive lists"). Once the primitive lists have been prepared for all the render output regions, each rendering tile is processed, by rasterising and rendering the primitives listed for the rendering tile.

The process of preparing primitive lists for each render output region basically therefore involves determining the primitives that should be rendered for a given render output region. This process is usually carried out by determining (at a desired level of accuracy) the primitives that intersect (i.e. that will appear (at least in part) within) the render output region in question, and then preparing a list of those primitives for future use by the graphics processing system.

It should be noted here that where a primitive falls into more than one render output region, as will frequently be the case, it is included in the primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

It is known to implement the binning in a hierarchical fashion, using various different region sizes (levels in the hierarchy), e.g. going down to the rendering tile size (the lowest level). However, the binning may be performed in a more or less sophisticated manner, as desired.

Thus, in a tile-based processing system there will be an initial processing pass which, in effect, sorts the graphics primitives (and/or other graphics entities, geometry, etc.) to be processed into regions that the render output has been divided into for sorting purposes.

The tiles are then each rendered separately, and the rendered tiles are then recombined to provide the complete render output (e.g. frame for display). The rendering of a primitive for a tile is generally performed using a set of geometry data representing the primitive as well as state data indicative of the operations to be performed when rendering the primitive.

In a tile-based rendering system the primitive lists thus reflect the spatial distribution of the primitives in the render output, i.e. by specifying which primitives should be rendered for which regions/tiles. All of the geometry data for the render output is thus stored together in memory in a data structure for the render output, and the relevant primitive data for rendering a tile is obtained from this data structure by reference to the primitive lists. Any state data is then stored in a further data structure.

The Applicants believe there remains scope for providing alternative, improved graphics processing systems.

BRIEF DESCRIPTION OF THE DRAWINGS

Various embodiments will now be described, by way of example only, and with reference to the accompanying drawings in which.

Like reference numerals are used for like elements in the drawings as appropriate.

DETAILED DESCRIPTION

Figure 1:
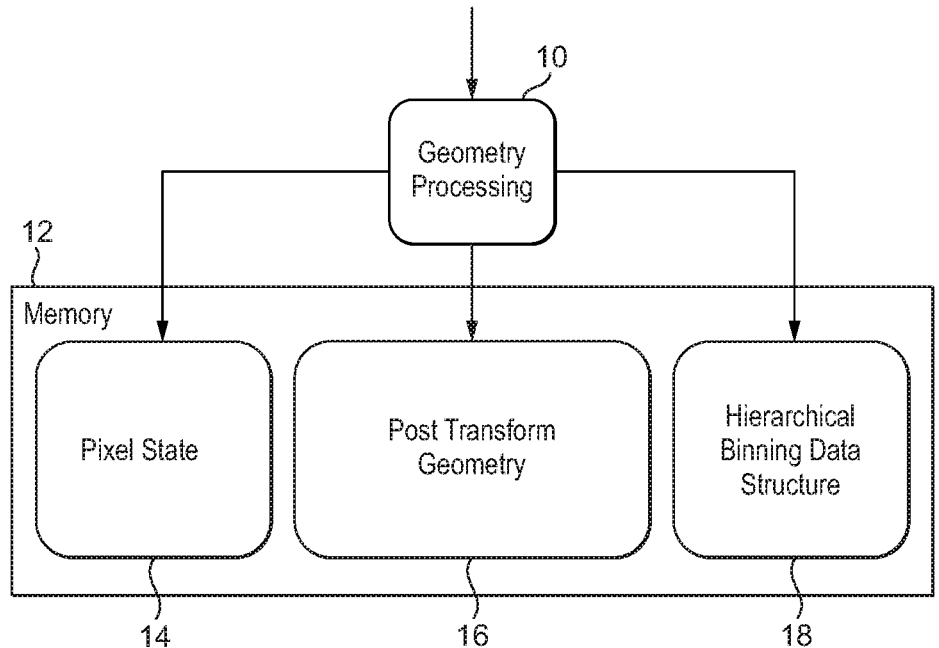
FIGS. 1, 2 and 3 schematically illustrate the operation of a traditional tile-based graphics processing system.

According to a first embodiment of the technology described herein there is provided a method of processing graphics primitives using a graphics processing system comprising a memory and a graphics processor in communication with the memory, wherein the graphics processor is configured to generate a render output by rendering a plurality of primitives for the render output, wherein each primitive is rendered by the graphics processor using associated primitive data including geometry data representing the primitive;

the method comprising:
dividing the render output into a plurality of regions for rendering, each region comprising a respective area of the render output; and for a set of one of more primitive(s) that is to be rendered:
obtaining associated geometry data for rendering the set of one of more primitive(s); determining for which of the plurality of regions of the render output the set of one of more primitive(s) should be rendered; and
for each region of the render output it is determined the set of one of more primitive(s) should be rendered for, storing the geometry data for the set of one of more primitive(s) in memory in a respective data structure for the region, such that the geometry data is stored in a respective, different data structure for each different region of the render output it is determined the set of one of more primitive(s) should be rendered for;
wherein the storing the geometry data for the set of one of more primitive(s) in a respective data structure for a region of the render output comprises:
storing geometry data for the set of one of more primitive(s) in a respective data structure for the region of the render output in a compressed form.

According to a second embodiment of the technology described herein there is provided a graphics processing system comprising a memory and a graphics processor in communication with the memory, wherein the graphics processor is configured to generate a render output by rendering a plurality of primitives for the render output, wherein each primitive is rendered by the graphics processor using associated primitive data including geometry data representing the primitive, the graphics processor comprising:

a primitive sorting circuit that is configured to:
for a set of one of more primitive(s) that is to be processed:
obtain associated geometry data for rendering the set of one of more primitive(s);
determine for which region(s) of a plurality of regions that the render output has been divided into for rendering purposes, each region comprising a respective area of the render output, the set of one of more primitive(s) should be rendered; and
a primitive data storing circuit, configured to:
for each region of a render output it is determined by the primitive sorting circuit that a set of one of more primitive(s) should be rendered for, store the geometry data for the primitive in the memory in a respective data structure for the region, such that the geometry data for a set of one of more primitive(s) to be rendered is stored in a respective, different data structure for each different region of the render output it is determined the set of one of more primitive(s) should be rendered for;
wherein the primitive data storing circuit is configured to store geometry data for a set of one of more primitive(s) in a respective data structure for a region of the render output in a compressed form.

In the technology described herein, the render output (which may, e.g., comprise at least a part of a frame to be displayed) is divided into a plurality of regions for rendering with each region including a respective area of the render output. The graphics primitives (which in an embodiment are initially defined by and represented as a set of vertices for each primitive) for the render output are then obtained and processed, e.g. in the usual fashion, in order to determine associated geometry data in a form that can be used by the graphics processor to rasterise/render the primitives (e.g.

which geometry data may, and in an embodiment does, comprise a group of transformed, or "shaded", vertices for each of the primitives).

Once the (e.g. transformed) geometry data has been obtained for a primitive or primitives (e.g. from a vertex shading circuit of the graphics processor), it is then determined for which region(s) of the render output the primitive should be rendered for. This is in an embodiment done by checking which of the regions of the render output are at least partially covered by the primitive(s) in question.

The geometry data required for rendering the primitive(s) is then stored in memory in a separate data structure for each of the respective different regions of the render output for which the primitive(s) in question is to be rendered. That is the geometry data is stored and organised on a "per region" basis with the geometry data for any primitives that need to be rendered for a particular render output region being stored in an associated data structure for that region.

Thus, when it is determined that a primitive should be rendered for plural different regions of the render output, the geometry data for the primitive is duplicated and stored in respective, different data structures for each of the regions of the render output for which it has been determined that the primitive should be rendered for.

According to the technology described herein the render output is thus divided into a plurality of smaller area regions for rendering, and primitive data for the primitives to be rendered for the render output is stored in memory in respective data structures associated with the different render output regions (and which data structures are associated only with a particular region such that the primitive data is stored separately for different render output regions).

For instance, whilst various embodiments have been described with reference to the processing of, and storing primitive data associated with, a single primitive, it will be appreciated that these steps will typically be repeated for a plurality of primitives that are to be rendered when generating a render output.

Correspondingly, the processing of the primitives, and the storing of associated geometry data, etc., may be performed for primitives individually, and/or a set (and respective sets) of plural primitives (which may, e.g., comprise a mesh/strip of primitives) may be processed together, e.g. with geometry data then being stored (in a compressed form) for the set of plural primitives. Various arrangements would be possible in this regard. Thus, in general, the processing may comprise processing a set of one or more primitive(s).

When a new primitive or set of plural primitives is received to be processed, this is in an embodiment then processed in the same manner described above and written into the appropriate data structure(s) in memory based on which of the render output region(s) the primitive (or set of plural primitives) is determined to fall at least partially inside.

A plurality of such data structures are thus generated and at any instant in time there may therefore (and typically will) be a plurality of data structures in memory that are associated with, and contain respective primitive data for, a corresponding plurality of different regions of the render output.

An effect of this arrangement is that, because the primitive data can be (and is) stored separately for each of the render output regions, the respective sets of one or more primitive(s) for each render output region (for which primitive data is stored) can then be read out from the associated data structure and processed further by the graphics processor independently of any of the other render output regions.

That is, each render output region for which data is stored can be processed independently of the other regions, using the respective data structure for the render output region.

For instance, once primitive data for a particular region has been written into an appropriate data structure in memory, that data can then be used in order to render the primitives for that region for which the primitive data is stored without necessarily having to wait on the processing of any other primitives (or any other regions). This means that at least some of the primitives that are to be rendered for the region may be (and in some embodiments are) rendered 'early' even though there are other yet to be processed primitives that may also need to be rendered for the region.

This approach is therefore in contrast to a traditional tile-based rendering system in which all of the geometry data for the entire render output must typically be processed up-front during an initial processing pass when generating the primitive lists (as it is only once all the geometry has been sorted into the regions that all the geometry that needs to be processed for a given tile will be known).

In such tile-based rendering systems the rasterising and rendering of the primitives in the tiles to generate the render output can accordingly only be done once all of the initial processing to sort the geometry, etc. into the regions (e.g. tiles) has been completed, and so, is, in effect, "deferred" until the initial processing of the primitives to sort them into the primitive lists has been completed.

Thus, in traditional tile-based rendering systems the primitive data for all of the primitives in the render output is typically stored together in such a manner that it is not possible to discern from the primitive data itself which primitives need to be rendered for which tiles, and this can only be done by reference to an additional data structure (i.e. the primitive lists) describing the spatial distribution of the primitives.

By contrast, in the technology described herein the primitive data is instead organised and stored on a per region basis, as explained above. Separate data structures can thus be generated (and then used), as required, for each of the regions as and when new primitive data that needs to be stored for those regions is generated, with the data structure for a particular region containing primitive data for that region (only).

Correspondingly, because the primitive data, etc., is stored for and organised as respective regions, there is no need for a separate data structure describing the spatial distribution of the primitives (e.g. a set of primitive lists).

It will be appreciated that this means data for the same primitive or set of primitives may therefore need to be stored in multiple places, i.e. a copy of the primitive data should be (and in embodiments is) stored in the respective data structures for each of the render output regions that the primitive(s) needs to be rendered for. (In a traditional tile-based approach, the primitive data for each primitive may only need to be stored once, as the spatial distribution (locality) of the primitive is specified by the primitive lists.)

However, this also means that primitive data stored for a particular region (in its respective data structure) can be discarded after it has been used. An effect of storing the data in this fashion, with the primitive data being organised and stored in separate data structures for the respective regions of the render output, is that it can thereby be ensured that any primitive data that is stored for a particular region (in its respective data structure) necessarily has the same locality (i.e. is associated with the same render output region) and also the same "life-cycle".

This means that it can therefore be guaranteed that any (and all) primitive data stored in a respective data structure for a particular region can be discarded once the primitive data has been used without impacting on any later rendering of the same, or any of the other, render output regions.

Accordingly, it is a benefit of the technology described herein that the primitive data stored in any one or more of the data structure(s) can be used, and then discarded, e.g. to free up memory space as required for new data as subsequent primitives are processed, even during the processing of a given render output unit of processing (e.g. draw call).

The technology described herein may therefore allow for an improved (more efficient) usage of memory space, as will be explained further below. In particular, since it is no longer necessary to wait for the processing for all of the geometry data for the entire render output unit of processing to complete before starting to use the geometry data to start rendering the output, the geometry data can be used, and the associated memory space reallocated, as required, in a more dynamic fashion.

For instance, in the technology described herein, the rendering may, in effect, be performed in a "partially deferred" manner, wherein the stored primitive data for at least some of the regions can be processed and used to render (at least in part) those regions without having to wait on the processing of any other data (and independently of any other stored data and/or data that is yet to be processed).

As well as organising and storing the geometry data for the primitives on a per region basis as discussed above, in the technology described herein geometry data for the primitives is stored in a compressed form for each region, i.e. the storing of geometry data on a per region basis also comprises the compressing of geometry data and storing for the primitives geometry data in a compressed form in the data structures for the respective regions for which a primitive is to be stored.

As will be discussed further below, the applicants have recognised that organising and storing the geometry data for primitives on a per region basis in the manner of the technology described herein further facilitates the compression (and better compression) of that geometry data. In particular, organising and storing of the geometry data for the primitives on a per region basis facilitates, for example, further conditioning of the geometry data before it is stored so as to make it more amenable to compression, thereby enhancing any compression that may be used and applied to the geometry data. This then has the effect of facilitating enhanced compression of the geometry data, thereby further reducing the amount of memory space that may be used and required when rendering a render output.

Furthermore, organising and storing the geometry data for primitives on a per-region basis in the manner of the technology described herein, in its embodiments at least, facilitates implementing compression techniques for the geometry data in hardware that might otherwise be undesirably expensive to implement.

The geometry data for the primitives that is stored on a per-region basis in the technology described herein can comprise any suitable and desired geometry data for a (and each) primitive or set of primitives. The geometry data that is stored for a primitive or set of primitives in an embodiment comprises one or more of, and in an embodiment both of: topology information for the primitive or set of primitives (e.g., and in an embodiment, defining which vertices to use for the primitive or sets of primitives and how they should be connected to each other), in an embodiment in the form of (at least) a set of vertex indices identifying the vertices to be used for the primitive(s) in question; and a set of vertex attribute data (in an embodiment positions) for each vertex for the primitive(s). The geometry data may also comprise a drawing order for the primitive(s). Other forms of geometry data would also or instead be possible, if desired.

At least some of the geometry data for a primitive (or set of plural primitives) is stored in a compressed form. In the case where the geometry data comprises more than one type of data, such as vertex indices and vertex attributes (e.g. positions), then one or both or all of the different types of geometry data may be stored in a compressed form. At least one of the different types of geometry data should be stored in a compressed form, but in an embodiment, all the different types of geometry data are stored in a compressed form. Each different type of geometry data that is compressed, could be compressed independently of (the) other types of geometry data (and, e.g., in a different way to (the) other types of geometry data), or all the geometry data could be compressed together (and, e.g., in the same manner), as desired.

In an embodiment, as well as storing (compressed) geometry data for the primitives on a per-region basis, an indication of state data that is to be used for rasterising and/or rendering the primitives is also stored for the primitives in a respective data structure for a render output region. This state data may, e.g., be defined for groups of plural primitives, e.g. per draw call (and shared by and used for all the primitives in the group, e.g. draw call, in question).

Thus, in an embodiment, each primitive is rendered by the graphics processor using associated primitive data which includes geometry data representing the primitive and state data indicative of the operations to be performed when rasterising and/or rendering the primitive, and the operation in the manner of the technology described herein comprises, for each region of the render output it is determined a primitive or set of primitives should be rendered for, storing the geometry data for the primitive(s) in memory along with an indication of state data that is to be used for rasterising and/or rendering the primitive(s) in a respective data structure for the region, such that the geometry data and the indication of state data for the primitive(s) to be rendered is stored in a respective, different data structure for each different region of the render output it is determined the primitive(s) should be rendered for.

Thus, an indication of associated state (control) data that may be required for rasterising and rendering a primitive(s) is also stored in the respective data structure(s) (the geometry data and the indication of the state data for a single primitive or set of primitives together constituting a set of 'primitive data' for the primitive(s)), such that the primitive data (i.e. the geometry data as well as state data that is required for rasterising and rendering a primitive(s), or at least an indication of such state data) for each one of a set of one or more primitive(s) that are to be rendered for a particular region is stored in a data structure associated with that region (and if necessary duplicated for each region of the render output it is determined that the primitive(s) should be rendered for).

The state data for a primitive(s) in an embodiment includes the parameters for the processing of the primitive(s), e.g. control data specifying which operations to perform when rasterising and/or rendering the primitive(s), and so on. Any suitable state (control) information that may typically or desirably be used when rasterising and rendering graphics primitives may be used and/or included for this purpose. Some or all of the state data may be "shared"

between plural primitives (or sets of primitives), e.g. where it is defined on a per draw call basis.

The stored indication of state data may be (some or all of) the state data itself, or may comprise a reference, e.g. in the form of a pointer, to state data that is stored elsewhere, for example in a separate "state data" data structure. Various arrangements may be possible in this regard.

The indication of the state data that is to be used for rasterising and/or rendering primitives may be stored for the primitives in a respective data structure for a render output region in a uncompressed form, but in the embodiment, the state data (indications) are also stored in a compressed form. This will be discussed further below.

The render output that is generated according to the technology described herein may, for example, comprise (at least a part of) a frame for display. For instance, the render output may comprise a (full) frame, or some other desired rendering unit, e.g. a draw call, for the frame. The render output is then generated by rendering one or more primitive(s) for the render output. The graphics processor uses associated state (if present) and geometry data when rendering the primitives, e.g. in the usual fashion.

For instance, the primitives may initially be defined by and represented as a set of vertices. Each vertex for a primitive has associated with it a set of data (such as position, colour, texture and other attributes data) representing the vertex.

The attributes of the vertices originally defined for a given graphics processing output (e.g. draw call) are thus in an embodiment subjected to an initial so-called "vertex shading" operation that operates to transform the attributes for each originally defined vertex into a desired form for the subsequent graphics processing operations. The initial processing of the primitives to generate the associated geometry data may thus comprise, for example, transforming the originally defined vertex position attributes from the world or user space that they are initially defined for to the screen space that the output of the graphics processing system is to be displayed in.

The initial processing of the primitives thus in an embodiment involves a step of vertex shading to generate transformed geometry data. The geometry data that is stored in the respective data structure(s) for the render output regions may thus comprise such transformed geometry data. Thus, in embodiments, the geometry data is obtained from a vertex shading stage of the graphics processor (pipeline).

However, in general, any other geometry-related processing that may typically or desirably by performed in a graphics processing system may be performed at this stage in order to generate (e.g. transformed) geometry data and other such data defining the primitives in the display in a form that is appropriate for use when rasterising and rendering the primitives.

As explained above, according to the technology described herein the render output (e.g. frame, or frame portion) is divided into a plurality of regions. In an embodiment, the render output is divided into a plurality of uniformly sized, e.g. rectangular (e.g. square), regions. However, other arrangements would of course be possible.

The regions may generally have any size, as desired. For example, in some embodiments, each region may correspond to a 32×32 or 64×64 array of fragments (and so it will be appreciated that the regions may be larger than the typical rendering tile sizes for conventional tile-based graphics processing systems). However, this need not be the case.

When processing a primitive or set of primitives in the manner of the technology described herein it is determined for which regions the primitive(s) needs to be rendered for. This may be done, for example, by determining the intersections of the primitive(s) with the regions of the render output (in a similar manner as would be done in a more traditional tile-based rendering approach when binning the primitives into their respective regions for rendering).

For each region that a primitive or set of primitives needs to be rendered for, a data structure is generated and stored in memory space, and the primitive data added into the data structure for the respective region(s), as required. There is therefore a self-contained data structure for each region of the render output that has a clear life-cycle and ownership of the data.

In an embodiment, the primitive data is written into the appropriate data structure(s) in the order that the primitives are received for processing such that as and when (new) primitive data is written into an appropriate data structure, the ordering of the primitives is maintained in the data structure (such that the primitive draw order, e.g. as specified by the API, is preserved). The data structure for a particular region therefore in an embodiment comprises an in-order list for the primitive(s) to be rendered for the region.

While it would be possible to store all the primitive data for a region in sequence in a block (of the data structure), with all of the data for one primitive (or set of primitives) stored after the data for the preceding primitive (or set of primitives), in embodiments, the geometry data is stored in a different region of the data structure to any state data (i.e. or the indicators thereof).

For example, in an embodiment, the geometry data for a (and each) primitive (or set of primitives) may include a set of (vertex) indices identifying the vertices for the primitive(s) in question, as well as the (transformed) vertex data for the primitive(s). In that case, the vertex indices (and any state data (indicators), if present) are in an embodiment stored in a first region of the data structure (a first set of memory positions/addresses) and the vertex data stored in a second, separate region of the data structure (a second set of memory positions/addresses). For instance, the first region may contain a list of indices interspersed with state data (indicators) (if present) for the primitives (such that there will, e.g., be a state data indication for a draw call, followed by indices for plural primitives for that draw call, followed by a new state data indication (e.g. for a new draw call), followed by another sequence of indices for plural primitives, and so on), with the second region containing the associated vertex data for the primitives.

The indices/state data may, for example, be written from the top down such that the list of indices/state data 'grows' down from the first available memory position. The vertex data may on the other hand 'grow' upwardly from the last available memory position.

However, other arrangements would of course be possible.

In the technology described herein, and as discussed above, some or all of the geometry data representing the primitives is stored in the data structure for a region of the render output in a compressed form. The geometry data can be compressed in any suitable and desired manner.

Where the geometry data includes more than one type of data, such as vertex indices, as well as a vertex data for the primitives, then only one, or some but not all, of the different types of geometry data could be compressed, or all of the (different types of) geometry data could be compressed. In an embodiment, all of the (different types of) geometry data are compressed.

Where more than one type of geometry data is compressed, the different types of geometry data could be subjected to the same compression process, and/or some or all or each of the different types of geometry data could be compressed independently of, and, e.g., and in an embodiment, in that case subjected to a different compression process to, the other types of geometry data. In an embodiment different types of geometry data are subjected to different compression processes.

In one embodiment the geometry data is compressed by applying a compression scheme to that data. In this case, the geometry data (e.g. the vertex data for the primitives) is in an embodiment subjected to an appropriate encoding (compression) scheme before that data is stored in the data structure for a region of the render output. In one particularly embodiment, an entropy encoding scheme is applied to the geometry data (e.g. to the vertex data) to compress it. In an embodiment, the geometry data is compressed by (also or instead) applying a delta (differential) encoding scheme to that data (by representing the geometry data as a set of difference (error) (delta) values, relative to a given, particular, e.g. reference, value or values).

The applicants have recognised in particular in this regard, that because primitives occupying the same region of the render output are being stored in the same data structure, the primitives for a render output region data structure will be spatially correlated (have a similar range of x, y values) and have some temporal correlation (depth values). This then means that it is likely that the values of geometry data for the primitives being stored for a given render output region (such as their vertex positions) will be similar to each other (and comprise a relatively reduced range of values within the output region in question, as compared, e.g., to the values of the, e.g. vertex positions, for primitives across the render output as a whole).

This then will have the effect that the geometry data to be stored for primitives in a data structure for a particular render output region should be more amenable to compression using entropy encoding schemes and, correspondingly, increase opportunities to encode the data more efficiently using a difference (delta) encoding scheme (and any other compression schemes that remove redundancies and exploit similarities in data), thereby facilitating enhanced compression of the geometry data for the primitives for the render output regions. Thus, organising and storing the primitive data on a per region basis may facilitate enhanced, e.g. entropy and/or differential encoding of the primitive geometry data, thereby facilitating enhanced compression of the primitive geometry data that is being stored for the respective render output regions.

Thus, in an embodiment, the geometry data that is compressed comprises vertex data (in an embodiment vertex positions), and that data is compressed by applying a compression scheme, such as, and in an embodiment, an entropy encoding scheme and/or a differential encoding scheme, to that data.

In these embodiments, the geometry data, e.g. vertex data, to be stored for the primitives may be compressed in its as provided/as generated form, for example by applying a compression scheme to that data in its initial form (and in one embodiment, this is what is done). However, in an embodiment the geometry data, e.g. vertex data, is converted to a different form (that is, e.g., and in an embodiment, intended to be more amenable to compression), before it is then compressed.

In an embodiment, the geometry data, and in an embodiment the (transformed) vertex data (e.g. positions) for the primitives, is compressed by converting that data to a different representation before storing that data in the data structure for a given render output region. For example, and in an embodiment, the geometry data could be, and is in an embodiment, converted from its initial (number) format (representation) to a different (number) format (representation). In an embodiment, the geometry data, in an embodiment the vertex data, is converted to a representation (e.g. from an initial floating point representation) that uses fewer bits per data value, such as to a fixed point representation and/or to a shared exponent representation, that will use fewer bits than the initial representations of the data values.

In an embodiment, the geometry data, and in an embodiment the (transformed) vertex data positions) for the primitives is compressed by converting that data to a differential (delta) representation, i.e. by representing the data for the individual vertices, for example, as a set of difference values (deltas) relative to another value or values, and in an embodiment to a base (reference) value for the vertex data (attribute) in question).

For example, in an embodiment, in the case of the vertex positions for the vertices for the primitives for a render output region, those vertex positions are in an embodiment represented as a set of difference values (deltas) (one for each vertex) relative to a (defined) base (reference) position for the render output region in question. In this case, the base position for the render output region in question in an embodiment comprises a respective position of the render output region, such as the position of one of the corners, such as the top left corner, of the render output region. Each vertex position would then be encoded as a difference value relative to that base render output region position.

In this case, the base (reference) value (e.g. position) for the vertex data, e.g. output region position, could itself be stored in the data structure for the render output region in question, or it could be a value that is derived (and derivable) in use. For example, where the base (reference) value corresponds to a known base position for the render output region, that could be appropriately determined on that basis as and when the vertex data values (e.g. positions) are required. The vertex data values (e.g. positions) will then be recreated for use by adding their respective difference values (deltas) to the base (reference) value, e.g. output region position.

In this case, the vertex difference values (deltas), at least in the case of vertex positions, are in an embodiment represented using a (reduced) fixed point or a shared exponent representation.

In an embodiment, the vertex positions are also or instead (and in an embodiment also) encoded (compressed) by encoding (representing) the vertex positions for at least some of the vertices for the primitives for the render output region in question as differences (delta vectors) relative to a reference value that is a predicted position for the vertex in question. In such an arrangement, the position of a vertex for a primitive is in an embodiment predicted from the vertices of another primitive or primitives, e.g. of a neighbouring primitive, and then the difference between the predicted vertex position and the actual vertex position stored (e.g. as a delta vector) as the position data for the vertex in the data structure for the render output region.

In this case, the predicted position for a vertex can be predicted from positions of the vertices from another primitive(s) in any suitable and desired manner. In an embodiment, a "parallelogram prediction" is used for this purpose, i.e. for respective pairs of primitives (sharing two vertices) the position of vertex for one primitive of the pair is predicted to complete the parallelogram formed by the vertices of the other, neighbouring primitive of the pair, with the difference between that predicted vertex position and the actual vertex position then being stored as the vertex position data for the vertex in question in the data structure for the render output region in question. Other forms of vertex position prediction could be used, if desired.

In this case, it will be appreciated that some but not all of the vertex positions for the vertices for primitives for render output region will be predicted in this way. For example, the vertex positions of the first primitive for a render output region could be stored as the actual vertex positions (but, e.g., represented relative to a base (reference) position for the render output region in question, as discussed above), but with the vertex positions for one or more further primitives that are present in the render output region in question and added to the data structure for that render output region then being represented using vertex position prediction and as differences (errors) relative to their respective predicted positions. This may be particularly applicable where the primitives are in the form of a polygon mesh, triangle strip, etc.

In this case, when recreating the vertex positions for use when rendering the primitives in question, the corresponding predicted vertex position would first be determined, and then the difference (error) relative to that predicted position stored in the data structure for the render output region added to that predicted position to derive the actual position of the vertex (with the so-derived position then being added to a further base, reference position, to derive the actual position of the vertex, if appropriate).

Thus, in an embodiment, vertex data, and in an embodiment the vertex positions for the primitives, that is stored in the data structure for a render output region is compressed by representing that vertex data (and in an embodiment the vertex positions) as difference values relative to a base (reference) value or values (which base value(s) may, e.g., be a global base value for the render output region as a whole, and/or may be a particular base value for the vertex in question, such as a predicted value (e.g. position) for the vertex in question). The position and difference values are in an embodiment then further converted to a fixed point or shared exponent representation.

The geometry data, e.g. vertex data, e.g. vertex positions, could simply be encoded (compressed) in the data structure for a render output region by converting the representation of that data in one or more of the manners discussed above (for example to a different number format and/or to a relative (differential) encoding scheme). However, in an embodiment, the so-converted representations of the geometry data (e.g. vertex data) are then further subjected to a compression scheme, such as an entropy encoding scheme, to further compress that data. The applicants have recognised in this regard that, for example, converting vertex data to a set of difference data (as discussed above) is likely to make that data even more amenable to compression using an, e.g., entropy encoding scheme, and thus converting the data and then further encoding it will reduce the size of the geometry data even further.

In the case where the geometry data includes set(s) of vertex indices identifying the vertices to be used for primitives for the render output region in question, then in an embodiment, that vertex index data is compressed by indexing the vertices such that the vertices to be indicated in the data structure for the render output region in question are respectively indexed within a set of vertices for the region of the render output in question (as opposed to being indexed with respect to a set of vertices for the render output as a whole).

In this case, a set of vertex indices could be used for the data structure for a render output region as a whole (i.e. such that within the data structure for the render output region, each different vertex that is in the data structure will have a respective different index value that is used for it in the data structure in question). In one embodiment, this is what is done. In this case therefore, each respective data structure for a respective render output region will have the vertices within that data structure indexed relative to each other, but the indices will, e.g., and in an embodiment, repeat between different respective data structures.

In an embodiment, where, as is discussed further below, the data structures for the render output regions comprise one or more respective memory blocks, with each memory block storing geometry data (and, in an embodiment, state data) for some (but not all) of the primitives within the data structure and render output region in question, then in an embodiment, the vertex index data is compressed by indexing the vertices within the individual memory blocks (rather than within the overall data structure for the memory output region (e.g. across the plural memory blocks that make up the data structure for the render output region)).

In this case therefore, the vertices stored within a particular memory block of the data structure for a given output region will be indexed such that each different vertex within that memory block has a different index in that memory block itself, but the indices (and sets of indices) may be duplicated (and will repeat) across the different memory blocks that make up the overall data structure for the render output region. In other words, in this case, each different memory block making up the data structure for the render output region will have the vertices within that memory block indexed relative to each other, but those indices will not be indexed (and do not need to be indexed) relative to vertices in other memory blocks making up the data structure for the render output region.

Thus the vertices to be indicated in the memory block in the data structure for the render output region in question will be respectively indexed within the set of vertices in that memory block (as opposed to being indexed with respect to a set of vertices for the data structure for the render output region as a whole).

In other words, a (and each) set of vertex indices identifying vertices for a region of the render output that is used in the data structure for the render output region is in an embodiment a set of indices (and uses index values) that index the vertices locally within the data structure (and in an embodiment within a memory block of the data structure) for render output region in question, relative to each other, rather than relative to all the vertices in the render output as a whole. This may allow, for example, the vertices to be indexed using a reduced range of index values in the data structure for a render output region. For example the index values to be stored for the vertices within the data structure for a region of the render output may be reduced from, for example, 32 bit indexes to 8 bit indexes.

Thus, in an embodiment, a (and each) set of vertex indices to be used to indicate vertices to be used for primitives for a render output region that is stored in the data structure for that render output region comprises a modified set of indices that has an index range that is smaller than the index range that the vertex indices are initially defined in (with respect to).

The reduced index range should be able to index (accommodate) (and thus correspond to and be based on) the number of vertices that (could) need to be indexed in the data structure (or a memory block of the data structure, as appropriate) for a (the) render output region alone (as, compared, for example, to comprising an index range that can index (accommodate) (and corresponding to and that is based on) the number of vertices that could be used for the render output as a whole).

In other words, the vertices to be indexed and stored in a data structure for a particular render output region are in an embodiment re-indexed from their initially defined indices (which may, e.g., index the vertices within the set of vertices for the render output as a whole) to indices within a set of indices that indexes the vertices within the set of vertices for the data structure for (and in an embodiment within the set of vertices for a memory block of the data structure for) that particular render output region specifically, with the re-indexed vertex indices then being used and stored as the vertex indices in the data structure (memory block) for the render output region.

The Applicants have recognised in this regard that in the arrangement of the technology described herein where respective, independent, data structures are prepared for respective render output regions (and that have their own, self-contained "lifecycle"), then it is possible to re-index vertices (for example) within a given render output region data structure, as there will be no need for the vertices to be distinguishably indexed with respect to vertices that are to be processed for any other render output regions (or memory blocks for the same render output region data structure).

In this case, when a vertex is to be added to a data structure for a render output region, that vertex is in an embodiment assigned a new, local, index value (such as the next lowest available index value) from the (reduced) index range for the render output region data structure (or memory block of that data structure) in question, and then that new, local index value, stored as the index for that vertex in the data structure (memory block) for the render output region in question.

Thus, in an embodiment, the compressing of the geometry data comprises converting the (initially defined) vertex indices for the primitives to be stored in the data structure for a render output region to either a set of local indices for the data structure for the render output region in question as a whole, or, in an embodiment, to one or more, and in an embodiment plural, sets of local indices for the data structure for the render output region in question, namely one set of local indices for each memory block making up the data structure for the render output region in question.

In an embodiment, it is first determined whether the data for the vertex in question has already been stored in the data structure (or the memory block of the data structure, where the re-indexing is per memory block) for the render output region in question (which the applicants have recognised would be a possibility in the context of the technology described herein, as primitives within a given render output region may typically, and be likely to, share vertices). In the case that the vertex (the vertex data for the vertex) has already been stored in the data structure (or memory block) for the render output region, the previous index used for the vertex data is in an embodiment then used as the index for the "new" vertex for the primitive in question.

In other words, when it is determined that the vertex data for a vertex for a new primitive has already been stored in the data structure (or memory block, as appropriate) for a render output region, then the index for that previously stored vertex data is used as the index for the vertex for the new primitive. This will then have the effect of further reducing the number of different index values that are used and stored in a data structure (or memory block) for a render output region (and, correspondingly, make the index values that are stored more amenable to further compression).

Correspondingly, in this case where the vertex data for a vertex for a new primitive has already been stored in the data structure (or memory block) for a render output region, then the vertex data for the new primitive need not be, and in an embodiment is not, written to the data structure (or memory block) for the render output region in question (again), thereby avoiding duplication of vertex data in the data structure.

(On the other hand, if the vertex data for the vertex in question has not previously been stored in the data structure (or memory block) for the render output region, then the vertex should be allocated a new, local, index value, and the vertex data for the vertex stored in the data structure (or memory block) for the render output region.)

The fact that the data for a vertex that has already been stored in the data structure (or the memory block of the data structure, as appropriate) for a render output region can be determined in any suitable and desired manner. This is in an embodiment determined by identifying that the vertex has the same (initially) defined vertex index as a vertex that has already been stored in the data structure (or the memory block of the data structure) for the render output region in question. This will be possible because the primitive data storing circuit will receive vertices identified by their (originally) defined indices, and so will be able to see when received vertices have the same index, and so then be able to map that index to the same "local" index for the vertex in the data structure (or memory block of the data structure) in question.

Again, the modified index data could then be, and is in an embodiment, subjected to a compression scheme, such as entropy encoding that data, so as to further compress that data.

Other arrangements would, of course, be possible.

Thus, in an embodiment, the compressing of the geometry data for a primitive or set of plural primitives when it is stored in a data structure for a render output region comprises modifying that data from its initial form, for example by one or more or all of: representing that data using a different number format; representing the data as differences relative to one or more base (reference) (e.g. provided, derivable, predicted or predictable) data values; and representing that data using a smaller numerical range.

The so-modified data is in an embodiment then subjected to a compression scheme, such as an entropy encoding scheme.

Correspondingly, in an embodiment, where the geometry data for the primitives comprises vertex indices and vertex data (e.g. positions), the compressing of the geometry data comprises converting the vertex indices to one or more sets of local indices for the data structure for the render output region in question (in an embodiment with the further identification and removal of any "duplicated" vertices within the indexing of the vertices), together with, for the vertex data (e.g. positions), converting that data to a different representation in one or more of the manners discussed above, for example by using a different number format and/or by encoding that data in a different form, such as in a differential form (for example relative to base data values and/or predicted values for that data), and then subjecting one or both, and in an embodiment both, of the converted indices and converted vertex data to a compression scheme, before then storing that data in (writing that data to) the data structure for the render output region in question.

In this case, in an embodiment, the positions (position attributes) for the vertices are converted to a shared exponent or reduced fixed point number format, with other vertex attributes being differentially encoded (as delta values relative to appropriate reference values). Correspondingly, the converted indices and converted vertex data are in an embodiment subjected to an entropy encoding compression scheme.

In an embodiment, as well as storing geometry data for the primitives in a compressed form in the data structures for the render output regions, in the case where state data (as discussed above) is also stored for the primitives in the data structures for the render output regions, that state data is also stored in the data structures for the render output regions in a compressed form. In this case, the state data could be compressed in any suitable and desired manner, for example in one or more of the manners discussed above for the geometry data.

In an embodiment, the state data is stored using differential (delta) encoding, i.e. by storing an initial (base) state data value or values, and then storing the differences from that initial (base) value or values when new or different state data needs to be stored for later primitives (or sets of primitives) that are added to the data structure for the render output region.

In this case, a complete indication (or set of the state data) (a complete state data indication or value or values) would be stored for the first (the initial) primitive (or set of primitives) stored in the data structure for a render output region, but then new or different state data that is needed for later primitives (or sets of primitives) that are added to that data structure would be stored as a respective set of one or more difference values from that initial state data indication or value or values.

For example, the state data for a first draw call to be stored in the data structure for an output region could be indicated appropriately, but then if individual primitives or sets of primitives or sets of primitives have different state data to the overall state data for the draw call in question, that would then be indicated using appropriate, e.g., difference values from the initial state data, and then when primitives for a new draw call are to be added to the data structure, again a new state data indication (or state data value or values) would be added, in an embodiment as a difference value, to the data structure, and so on.

As discussed above, the state data could comprise the actual state data value or values, or it could comprise an indication (such as a pointer) to state data that is stored elsewhere.

In the former case, a "full" (reference) state data value or values would, e.g., be stored for a, e.g. the first, primitive included in a data structure for a render output region, but then later state data value(s) for other, e.g. subsequent, primitives, that are included in (added to) the data structure would be stored as respective difference values from the full data value(s) for the, e.g. first, primitive (i.e. such that the later state data value(s) in the data structure would be determined by adding the difference value for the later state data value to the full state data value(s) initially included in the data structure for the render output region).

Correspondingly, in the latter case, a "full" pointer would be stored for a reference, e.g. the first, primitive included in a data structure for a render output region, but then the pointers for new state data that are added to the data structure would be stored as respective difference values from the full pointer for the reference, e.g. first, state data value (i.e. such that the pointers for the, e.g. later, state data values would be determined by adding the difference value for the, e.g. later, state data pointer to the full pointer value for the reference, e.g. initial, state data pointer to thereby determine a pointer value for the, e.g. later, state data pointer).

Other arrangements would, of course, be possible.

As will be appreciated from the above, in the technology described herein, data structures for respective regions of a render output will be generated and stored in memory.

In an embodiment, the memory space that is allocated to (and is available to be allocated to) a region comprises memory space from an appropriate pool of free memory space (a "heap") for use by the graphics processor.

The pool may thus comprise a number of "blocks" of memory space each of which is available to be allocated for a region of the render output. A data structure for a particular region may thus comprise a set of one or more such block(s) of memory space. In some embodiments these are fixed-size blocks of memory space. However, this need not be the case, and it is also contemplated e.g. that the size of a memory block may be variable.

In an embodiment, the size of the blocks of memory space that are allocated for this purpose are based on, and selected so as to be compatible with, the compression scheme and process that is being used for the geometry data. For example, and in an embodiment, in the case of using fixed-size blocks of memory space, the fixed block size is in an embodiment based on and selected so as to be large enough to match the desired compression rate (the compression window).

Once a block of memory space has been allocated for a particular region, any primitive data for the region can then be added into the block (at least until the block is full). In an embodiment this is done in the manner described above with the indices and any state data written from one end of the block (e.g. downwardly from the top of the block) and the vertex data written from the other end of the block (e.g. upwardly from the end of the block.

When a block is full, another block of memory space from the pool of free memory space can be allocated for the region, and a suitable pointer generated pointing from the end of the first block to the new block, and so on, to store the primitive data for the region. The data structure for a particular region may thus comprise a linked set of memory blocks.

Thus, in this case, each memory block making the data structure for a render output region will, in effect, and in an embodiment, store its own set of primitives for the render output region, and in a particular the primitive data, comprising geometry data and, in an embodiment, state data, for a given subset of primitives within the overall set of primitives that is stored in the data structure for the render output region. Correspondingly, as discussed above, each memory block making up the data structure for a render output region is in an embodiment handled and compressed in the manner discussed above, so that, in effect, each memory block of the data structure for a render output region in itself comprises a "self-contained" set of data that can be processed independently of the other memory blocks of the data structure for the render output region (and that accordingly has its own independent life cycle).

In an embodiment, the allocation of memory space within the memory space pool to primitive data (for render output regions) is performed by first allocating a block of memory space for a region, and then allocating space within that block to individual primitives or sets of primitives that are determined to fall within that region (and that should therefore be rendered for the region), until the block is full (at which point, if there is still space in the memory space pool, a further block is allocated and then progressively filled with primitive data, and so on, until there is no more space in the memory space pool).

Thus, in embodiments, the memory space pool comprises a plurality of memory blocks, and generating a data structure for a region comprises: allocating a first memory block for the region and adding primitive data for the region into the first memory block until the first memory block is full; and when the first memory block is full, allocating a second memory block for the region and linking the first and second memory blocks such that the data structure comprises a set of linked memory blocks. This is in an embodiment then repeated if/when the second memory block becomes full, with a third memory block then being allocated and linked to the second memory block, and so on.

Correspondingly, the primitive data storing circuit is configured to generate a data structure for a region by: allocating a first memory block for the region and adding primitive data for the region into the first memory block until the first memory block is full; and when the first memory block is full, allocating a second memory block for the region and linking the first and second memory blocks such that the data structure includes a set of linked memory blocks.

Each block from the memory pool is in an embodiment the same size, and is in an embodiment configured to always be an integer number of cache lines (e.g. an integer number of 64-byte cache lines). This means that the start of each new block will be cache-line aligned. This arrangement may facilitate more efficient memory accesses, for example by facilitating using complete cache lines for the primitive data that is stored for each region.

The memory space may thus be (dynamically) partitioned into a list of 'free' memory blocks that have not (yet) been allocated as well as a number of lists of 'active' memory blocks that have been allocated for the different regions. As blocks are allocated, they are then removed from the free list and added to the active list for the associated region. Correspondingly, after the data in an active block has been used, it can then be discarded, and the block made available for reallocation, and moved back into the free list.

If the available memory space is sufficiently large to store all of the primitive data that will be generated for the render output, the entirety of the primitive data may be written in order into such data structures, and then passed to the next stage of the graphics processor (e.g. for rasterisation/rendering, as required) only after all of the data has been processed.

That is, provided that the available memory space is large enough, the technology described herein may be used to perform a fully "deferred" rendering process.

This may be the case, for example, when the primitive data is stored in a portion of main (system) memory (e.g. DRAM). In that case, the memory space may grow over time, as and when additional storage is required. Thus, in some embodiments, the primitive data may be continuously written into such data structures in memory until all of the primitives have been processed.

However, it will be appreciated that there may only be a certain, fixed amount of available memory (and in embodiments this is the case) which can therefore become full as new data is added and memory space used up. That is, in some embodiments, the amount of memory space that is available to be allocated for primitive data is smaller than the amount of memory that would (be expected to) be required to store all of the primitive data that would be generated for the entire render output unit of processing.

For instance, this may be the case where the memory comprises a dedicated, fixed-footprint portion of SRAM, or where it is desired to store the primitive data more locally to the graphics processor in a suitable local cache system.

Indeed it is an advantage of the technology described herein that because memory space can be and is in an embodiment allocated for regions "on demand" when it is determined that a primitive is to be rendered for a region, a smaller amount of memory space can be set aside for storing the primitive data in comparison, e.g., to more traditional tile-based arrangements in which the primitive data for the entire render output must be stored before any of this data can be used.

For instance, in modern tile-based graphics processing systems, the primitive (geometry) data is increasingly too large to be effectively cached locally to the graphics processor. By contrast, in the technology described herein, memory space can be dynamically allocated, and then re-allocated as data structures are used up, and their associated memory space freed for new data. This makes it possible to use a relatively smaller amount of memory space, which may enable a more effective local caching of the primitive data, whilst maintaining throughput of primitive data.

In other words the technology described herein may help reduce the amount of "in flight" data that needs to be stored in the memory space at any given time. This may in turn facilitate an improved (more efficient) usage of available memory space and/or improvements in power or performance.

The technology described herein can thus advantageously be implemented using a range of different (sized) memory systems and may allow for various optimisations in terms of power and performance in each case. A benefit of the technology described herein is therefore that it provides a highly scalable approach that can be used in conjunction with a range of memory types (e.g. DRAM, SRAM, cache, etc.).

Thus, when new primitive data for a primitive associated with a particular region is to be written to memory, it is in an embodiment first determined whether memory space (a data structure) has already been allocated for the region. If memory space has already been allocated for the region, i.e. such that there already exists in memory a data structure for that region, the primitive data can then be added into the appropriate data structure in the allocated memory space for the region. In an embodiment the data structure comprises a number of memory blocks. When the current memory block is full, a new, free memory block can then be allocated and linked to the data structure.

On the other hand, if no memory space has yet been allocated for that region (and no data structure yet exists), memory space can be allocated for the region, and a new data structure for the region generated into which the geometry (and state (indicator)) data for the primitive can then be added. In an embodiment this is done by allocating a free block of memory space for the region in question.

Thus, in embodiments, the step of storing the primitive data in a respective data structure for a region comprises: determining (e.g. by the primitive data storing circuit of the graphics processor) whether a data structure for the region already exists in the memory, and when a data structure for the region already exists in the memory adding the primitive data to the existing data structure, whereas if no data structure for the region exists, the method comprises generating a new data structure for the region.

Correspondingly, the primitive data storing circuit may be configured to, when storing the primitive data in a respective data structure for a region: determine whether a data structure for the region already exists in the memory, and when a data structure for the region already exists in the memory add the primitive data to the existing data structure, whereas if no data structure for the region exists, the primitive data storing circuit is configured to generate a new data structure for the region.

It will be appreciated that in any of these cases, new memory blocks will periodically need to be allocated for storing primitive data (whether to expand the capacity for an existing region data structure, or to start a new region data structure). As such, the pool of available memory will progressively be used up (e.g. as memory blocks are allocated and moved from the 'free' list into the 'active' list) as data structures are generated and stored.

This being the case, the Applicants have recognised that when it is determined that the available memory pool is becoming full (or nearly full), it may be desirable to 'flush' out at least some of the (existing) data structures in memory. For instance, when there is new primitive data (either for a new region, or a region for which a data structure already exists in memory) to be written into memory, but the memory space is full (or nearly full), it may be desirable to start to use (and flush out) some of the data that is currently stored in memory, e.g. to allow for continued throughput of primitive data.

That is, when it is determined that there is no available memory, or less than a threshold amount of memory is available, some of the active blocks can be (and in an embodiment are) flushed from memory for use by the graphics processor, and then discarded to free up memory space for new data. For example, this may be done when it is determined that there is less than a (e.g. predetermined) threshold of available memory space, e.g. less than a threshold number of free memory blocks.

The technology described herein facilitates this operation because the primitive data is stored on a per region basis such that data can be selectively (and independently) flushed for one or more regions, and it is ensured that this data can be used, and then discarded to free up memory space, without impacting on any subsequent operations.

Thus, in an embodiment, when new primitive data is to be written to memory, but the memory is full (or more in an embodiment nearly full), one or more of the region(s) are selected to be rendered and the data in the associated data structure(s) in memory for the selected region(s) is then processed (used), such that the associated data structure(s) in memory for the selected region(s) can then be flushed from memory (the stored data discarded).

The method thus in an embodiment further comprises, tracking the available memory space, and determining when there is less than a threshold of available memory space. When it is determined that there is less than a threshold of available memory space the method may comprise: selecting one or more of the region(s) to be rendered, reading out the data stored in the data structure(s) for the selected region(s), and then discarding the data structure(s) for the selected region(s) to allow new data to be written into the memory space.

In particular, in embodiments, when attempting to allocate a new memory block (either to an existing data structure for a region, or to create a new data structure), it is in an embodiment determined whether there is less than a threshold of available memory space, and when there is less than the threshold of available memory space: selecting one or more region(s) for which a data structure already exists in memory to be flushed from memory; reading the data out from the data structure(s) for the selected region(s) for use by the graphics processor; and then discarding the data structure(s) for the selected region(s) from memory to free up memory space.

Correspondingly, when it is determined that new geometry data and state data for a primitive should be stored in one or more data structure(s) in memory, the primitive data storing circuit is configured to: determine whether there is less than a threshold of available space in the memory, and when there is less than the threshold of available space in the memory, a read-out circuit is configured to: select one or more region(s) for which a data structure already exists in memory to be flushed from memory; read the data out from the data structure(s) for the selected region(s) for use by the graphics processor; and then discard the data structure(s) for the selected region(s) from memory to free up memory space.

The regions (blocks) that are flushed (used) may be selected based on any suitable criteria. For instance, in one embodiment, it is determined for which region(s) the data structure is largest (e.g. containing the most number of memory blocks and/or the greatest amount of primitive data), and that data structure is then selected to be flushed (used). Thus, in embodiments, one or more region(s) are selected to be flushed based on for which of the region(s) the greatest amount of primitive data is (currently) stored in the memory. The read-out circuit may thus be configured to select region(s) to be flushed based on for which of the region(s) the greatest amount of primitive data is (currently) stored in the memory. The determination may however be made in a more or less sophisticated manner, as desired.

For instance, the determination may be made based on which region(s) have already been at least partly rendered. For example, the system may track how many primitives have been processed for the different regions and take account of this when selecting which region(s) to be flushed.

However, other arrangements would of course be possible. For example, the system may select region(s) to be flushed based on any suitable, e.g. lifetime, policy.

It may also be desirable to be able to explicitly flush (all of) the data structures from memory, e.g. for system maintenance purposes and/or at the end of a (e.g.) frame, and in embodiments this may be done.

The data from the data structure(s) for the selected region(s) is in an embodiment read out from memory and then used for rasterising/rendering the primitive(s) for the region. For example, the data may be read out and then passed to a rasterisation circuit of the graphics processor, wherein the primitives are in an embodiment rasterised (optionally after any primitive set-up is performed) and then, if needed, rendered for the output.

A read-out circuit of the graphics processor may thus be configured to read the data out from the data structure(s) for the selected region(s) for use by the graphics processor by passing the geometry data (and state data) to the graphics processor for rendering the primitives for which such data is stored in the data structure(s) for the selected region(s).

Thus, the graphics processor can start to render the selected render output region(s) using the data stored in its associated data structure.

It will be appreciated that the region(s) may only be partially rendered at this point since only the primitives for which data is currently stored (which may be less than all of the primitives that ultimately need to be rendered for the region) is flushed at this point. However, there may be further primitives that are to be rendered for that region, which have not yet been processed. In that case, when such primitives are processed, a new data structure for the region can be generated in the manner described herein, and then used/flushed, and so on, until all of the primitives have been processed.

Thus, in embodiments, the method may comprise selecting a first region to be flushed, rendering one or more primitive(s) for the first region using the geometry data and state data stored for the one or more primitive(s) in the respective data structure for the first region, and (after the data in the data structure has been used) discarding the data structure for the first region. When it is determined that a subsequent primitive should be rendered for the first region, the method then comprises generating a new data structure in memory for the first region, and so on.

Correspondingly, the read-out circuit may be configured to select a first region to be flushed, and to then read out the primitive data stored in the respective data structure for the first region so that the primitive data can then be used to render one or more primitive(s) for the first region. The data structure can then be discarded after the data has been used. When it is determined that a subsequent primitive should be rendered for the first region the primitive data storing circuit is then configured to generate a new data structure in memory for the first region.

Of course, in general, this may be performed for any, or a plurality of regions. Thus, at any instant in time, there may be a plurality of data structures for a corresponding plurality of regions, and these data structures may be flushed, and new data structures generated, as required.

However, other arrangements would of course be possible. For example, the flushed data need not be used directly (immediately) by the graphics processor for rasterising, etc., the primitive(s), and at least some of the data may be transferred to and temporarily held in other storage such as an intermediate buffer, or a different portion of (e.g. DRAM) memory, or similar. In that case, the associated memory blocks can be freed up by moving the data to such other storage. The flushed data can then be rendered from the other storage, e.g. at the appropriate time.

As discussed above, an advantage of the technology described herein is therefore that the primitive data is stored separately for each region such that the data can be used independently. Accordingly, when it is determined that there is no available memory, or less than a threshold amount of memory is available, one or more of the data structures (for a corresponding one or more region(s) of the render output) are in an embodiment read out from memory at this point and passed to the next stage of the graphics processor, e.g. for rasterisation and rendering. This helps ensure continued throughput of primitive data and a more efficient use of the available memory space.

Further, because the data is stored on a per region basis, it can be ensured that once the data has been used, it will not be needed again (e.g. for another region, since it would already be stored separately in the appropriate data structure for the other region), and so can be discarded at this point.

The memory space can thus be dynamically reallocated over time as and when new primitive data is generated. For instance, where there is a fixed region of memory that is partitioned into a number of fixed size blocks, the blocks can be allocated, used and re-allocated accordingly as the free list is consumed to maintain throughput whilst still allowing all of the data to be used and without impacting on any other operations.

This arrangement provides a more efficient usage of memory that can be readily implemented (and scaled) based on the amount of available memory space.

When the data from a data structure for a render output region has been read out for use by the graphics processor, then the compressed geometry data (and any compressed state data) should be appropriately decompressed before use by, and for use by, the graphics processor. Such decompression may be performed in any suitable and desired manner, for example, and in an embodiment, in accordance with and depending upon the way the geometry (and any state data) was compressed when storing it, and how that data is to be used (processed).

Thus, for example, and in an embodiment, in the case where the data has been compressed using a particular compression scheme, such as an entropy encoding scheme, the read-out data from the data structure is in an embodiment first subjected to the appropriate decompression process to decompress that data, with the decompressed data then being used by the graphics processor to render the render output region in question.

In the case where the geometry data is compressed by using a different representation (number format), then in an embodiment, the graphics processor processes that data in its modified, "compressed" format (i.e. using, e.g. fixed point and/or shared exponent, representations for the data), rather than, e.g., reconverting the data back to its original format. Alternatively, the data in the modified "compressed" representations could be first reconverted to the original representation (e.g. a floating point representation) before being processed by the graphics processor.

In the case where the geometry data, e.g. vertex positions, is compressed by representing that data as a set of difference values relative to some base and/or predicted value, then in an embodiment, the "full" data values are recreated by adding the respective difference value or values to the base or predicted values, before then being used by the graphics processor to process that data.

In the case where the vertex indices have been re-indexed using a smaller index range so as to compress that data when storing it for the region of the render output, then there is no need to (and so in an embodiment this isn't done) re-index the vertices back to their original indices, as the reduced range of indices provided for the data structure for the render output region in question can still be used to identify which particular vertices need to be processed for which primitives, etc., within the render output region in question. In this case therefore, the revised set of indices for the vertices for the primitives for the render output region in question are in an embodiment used as they are when rendering primitives in the data structure for the render output region.

In the case where state data for primitives for the render output region has been stored as a set of initial (base) values, together with appropriate differences (deltas) to those values, then when using the data to render the output region, the original state data is in an embodiment recreated using the initial (base) values and the appropriate difference values (deltas). This can be done in any suitable and desired manner, e.g., and in an embodiment, in dependence upon how the state data was differentially encoded in the first place.

Other arrangements would, of course, be possible.

In some embodiments each and every primitive that is received to be processed is processed in the same manner described above, i.e. by determining which render output regions the primitive should be rendered for, and then storing the primitive data in respective data structures for each region that it has been determined the primitive should be rendered for (such that where a primitive falls into multiple different regions, a copy of the primitive data for the primitive is stored in the respective data structures for each region).

However, it is also contemplated that less than all of the primitives may be processed in this manner. For instance, in some cases it may be desirable for some of the primitives to be processed and stored in a different manner. Thus, in some embodiments, when a new primitive is received to be processed, the method may further comprise first checking whether the primitive should be processed in the manner described above (and if so, proceeding to do so). Various options would be possible in this regard.

The technology described herein can be used for all forms of output that a graphics processor may be used to generate, such as frames for display, render-to-texture outputs, etc.

The graphics processor in an embodiment executes a graphics processing pipeline that can contain any suitable and desired processing stages, etc. that a graphics processing pipeline may normally include.

In some embodiments, the graphics processor comprises, and/or is in communication with, one or more memories and/or memory devices that store the data described herein, such as the primitive (geometry and state) data, etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, pipelines and "means" of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments of the technology described herein will now be described.

The technology described herein generally relates to methods for processing graphics primitives wherein the render output is divided into a plurality of smaller regions (areas) for rendering. In the present embodiments the primitive data is stored and organised on a per region basis. When a primitive is received for processing, it is thus determined for which region(s) of the plurality of regions into which the render output has been divided that the primitive should be rendered for, and the primitive data for the primitive (e.g. the geometry data representing the primitive and any state data indicative of the operations to be performed when rendering the primitive) is then stored in respective, different data structures for each different region of the render output, as will be explained further below.

However, by way of comparison, a more traditional tile-based rendering system will first be described with reference to FIGS. 1, 2 and 3. In a tile-based rendering system the render output is divided into a plurality of tiles for rendering. The tiles are then rendered separately to generate the render output. To do this, it is first necessary to sort the primitives according to which tiles they should be rendered for.

The primitive vertices are thus obtained and the usual geometry processing (e.g. vertex shading) is performed for all of the primitives in order to generate the post-transformed geometry data (e.g. transformed vertices).

In order to be able to know which primitives should be rendered for which tiles it is required to perform this processing up front for all of the primitives that are to be processed. The result of this is, as shown in FIG. 1, that all of the geometry data generated from the geometry processing 10 is then stored in memory 12 in a first data structure 16. The primitive lists are stored in a separate data structure 18 and any pixel state data is stored in a further data structure 14.

Figure 2:
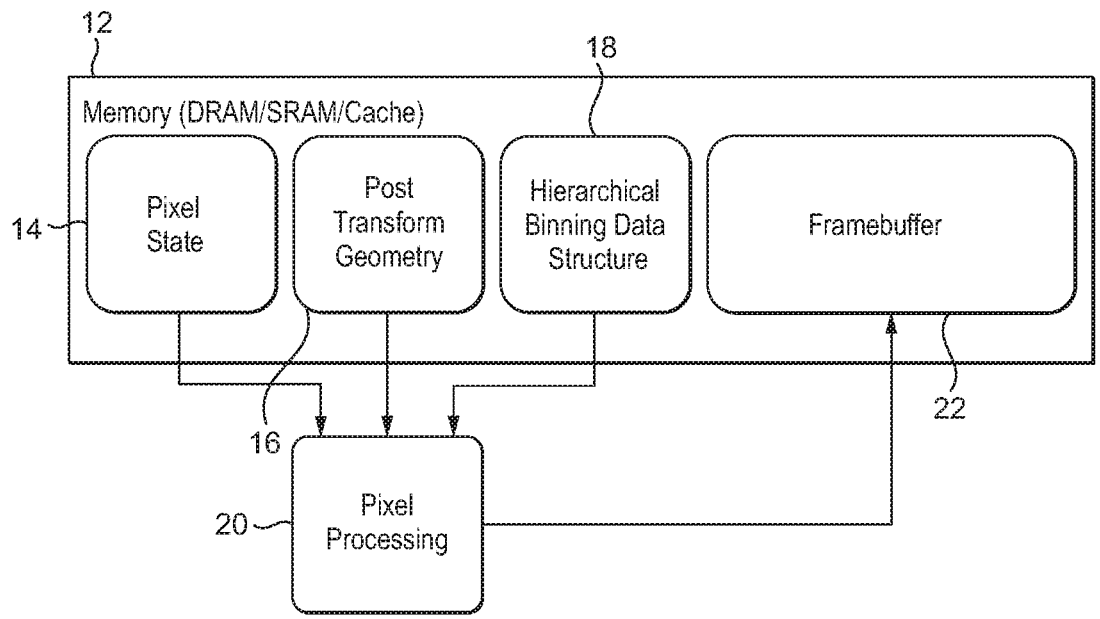
Figure 3:
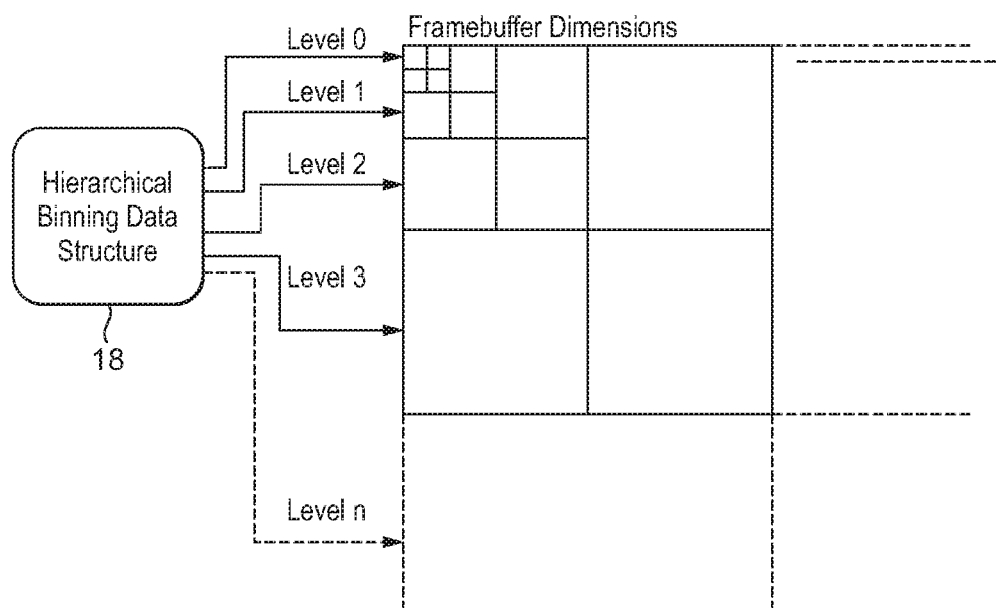

As shown in FIG. 2, once all of the geometry processing for the render output has completed, this data is then read out from memory and subject to further graphics processing 20 to generate the render output which may, for example, be written into a framebuffer 22. Other arrangements would of course be possible.

In particular, the graphics processing 20 is performed by using the primitive lists 18 to determine which primitives should be rendered and then rendering these primitives appropriately using the stored geometry data 16 and associated pixel state information 14. The rendering process is shown schematically in FIG. 3 (which illustrates a hierarchical binning process wherein primitive data is binned over a plurality of different levels (tile sizes), although this is not necessary and the binning may generally be performed in a more or less sophisticated manner as desired).

In the traditional tile-based graphics processing operation described above all of the geometry processing for the render output is performed in one go during an initial processing pass. This data is then used in a second processing pass during which the render output is generated by rasterising/rendering the primitive using their associated geometry.

For modern graphics processors, the primitive data for the render output can be relatively large such that it cannot be effectively cached in local storage associated with the graphics processor. The primitive data is therefore typically written back to main (system) memory, or at least to a relatively larger cache in the memory hierarchy.

The present embodiments provide a more efficient usage of memory. In particular, in the present embodiments, rather than storing all of the state and geometry data for the render output together, along with a separate binning data structure (e.g. the primitive lists) describing the spatial distribution of the primitives, the render output (e.g. framebuffer) is divided into a plurality of smaller area regions, and the state data and geometry data is stored in separate data structures for each of the render output regions.

Figure 4:
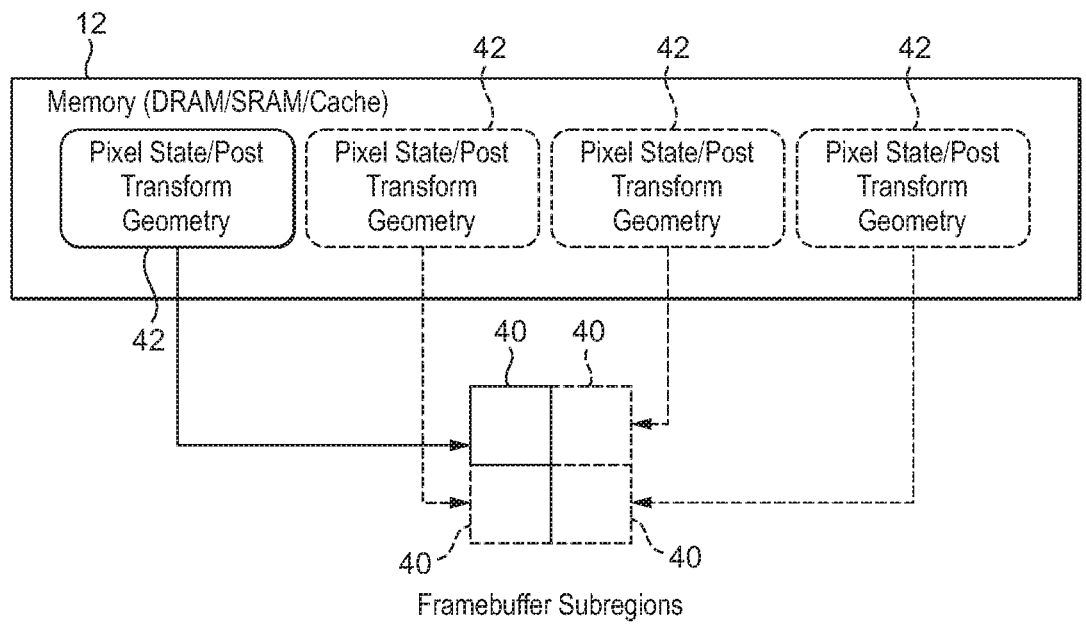
FIG. 4 shows an example of how primitive data may be organised according to an embodiment.
Figure 5:
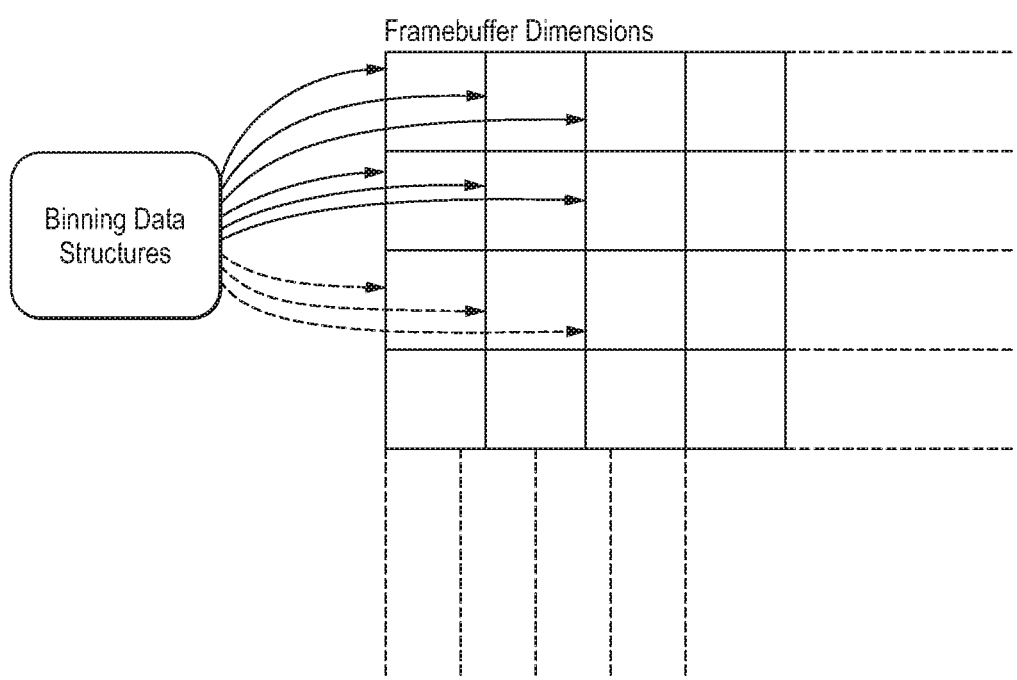
FIG. 5 shows schematically how the primitive data may be used when generating a render output according to an embodiment.

Thus, as shown in FIG. 4, each region of the render output 40 (e.g. frame buffer region) is associated with a respective data structure 42 in memory that contains pixel state and geometry data for that region (only). This means that each region can be processed independently, as illustrated in FIG. 5, using the data stored in its respective data structure 42.

Figure 6:
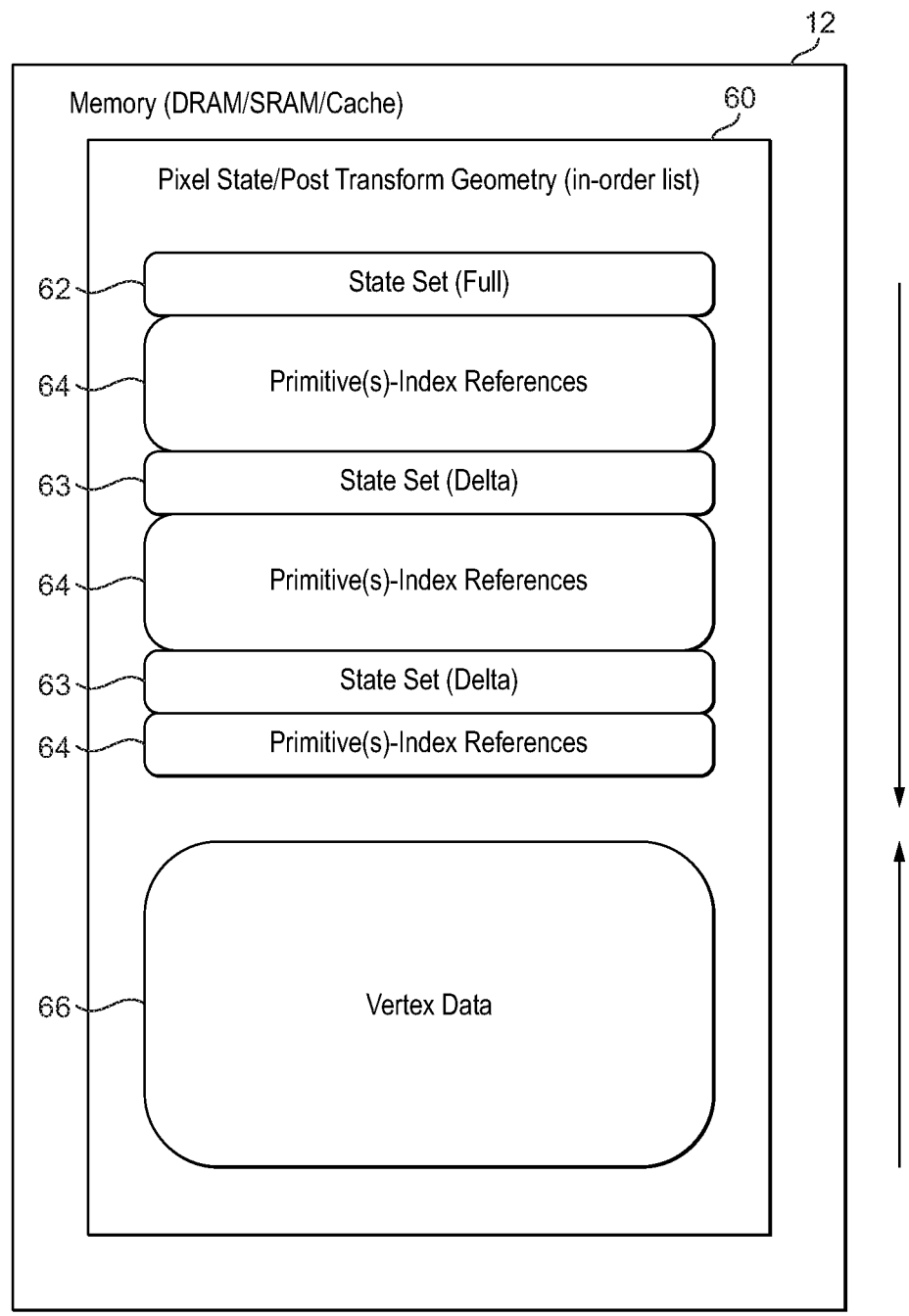
FIG. 6 shows schematically an example of a data structure that may be generated according to an embodiment.

FIG. 6 shows an example of a data structure 60 for a render output region according to the present embodiments. The data structure 60 comprises an in-order list of the state data and geometry data for any primitives for which it has been determined that the primitive should be rendered for the render output region associated with the data structure 60. The primitives in this regard may be any suitable and desired graphics primitives, such as "simple" polygons such as triangles or more complex representations, such as triangle strips, polygon meshes, etc.

In particular, the state data (which may be defined per draw call, for example) is stored in an interspersed manner with the primitive vertex index references in a first region of the data structure 60 that grows down from the top of the data structure (i.e. the first available memory position). Thus, the full state set 62 for the draw call that the first primitive in the data structure belongs to is stored, followed by the appropriate vertex index references 64 for the primitives that belong to that draw call (and that fall at least partially within the render output region in question). When a new draw call is started, the state set 63 for that draw call is then added followed by the appropriate vertex index references 64 for the primitives for that draw call, and so on. The vertex data 66 itself (e.g. (transformed) vertex positions, etc.) is stored in a second region of the data structure 60 that grows upwardly from the bottom of the data structure.

Furthermore, in the present embodiments, and as discussed above, the state data and the geometry data is stored in the data structure 60 for each of the render output regions in a compressed form.

As shown in FIG. 6, in the present embodiments, the state data that is stored in the data structure 60 is compressed by storing the first state set 62 in the data structure as a full (complete) set of state data, but then storing the subsequent state sets 63, 64, etc., that are added to the data structure as a set of difference values (deltas) relative to the first (full) state set 62 in the data structure.

The index references for the vertices forming the primitives are stored in a compressed form in the present embodiments by generating a new set of vertex indices covering (and encompassing) only the vertices that are stored in the data structure 60, and then indexing the vertices for the primitives stored in the data structure 60 in the data structure 60 using that reduced, local, set of vertex indices. This will be discussed further below.

Finally, the vertex data 66 is compressed in the present embodiments by converting the original (e.g. floating point) representations of that data to a representation (encoding) that uses fewer bits, and then entropy coding the so-converted vertex data so as to compress that vertex data further. Again, this will be discussed further below.

(Other compression arrangements could be used, if desired.)

In the present embodiments the memory space may be portioned into a plurality of memory "blocks" (or "chunks"). Thus, when a data structure for a region is generated, a memory block from the pool of available memory blocks can be allocated accordingly. As new primitive data for that region is processed, this memory block may become full.

Figure 7:
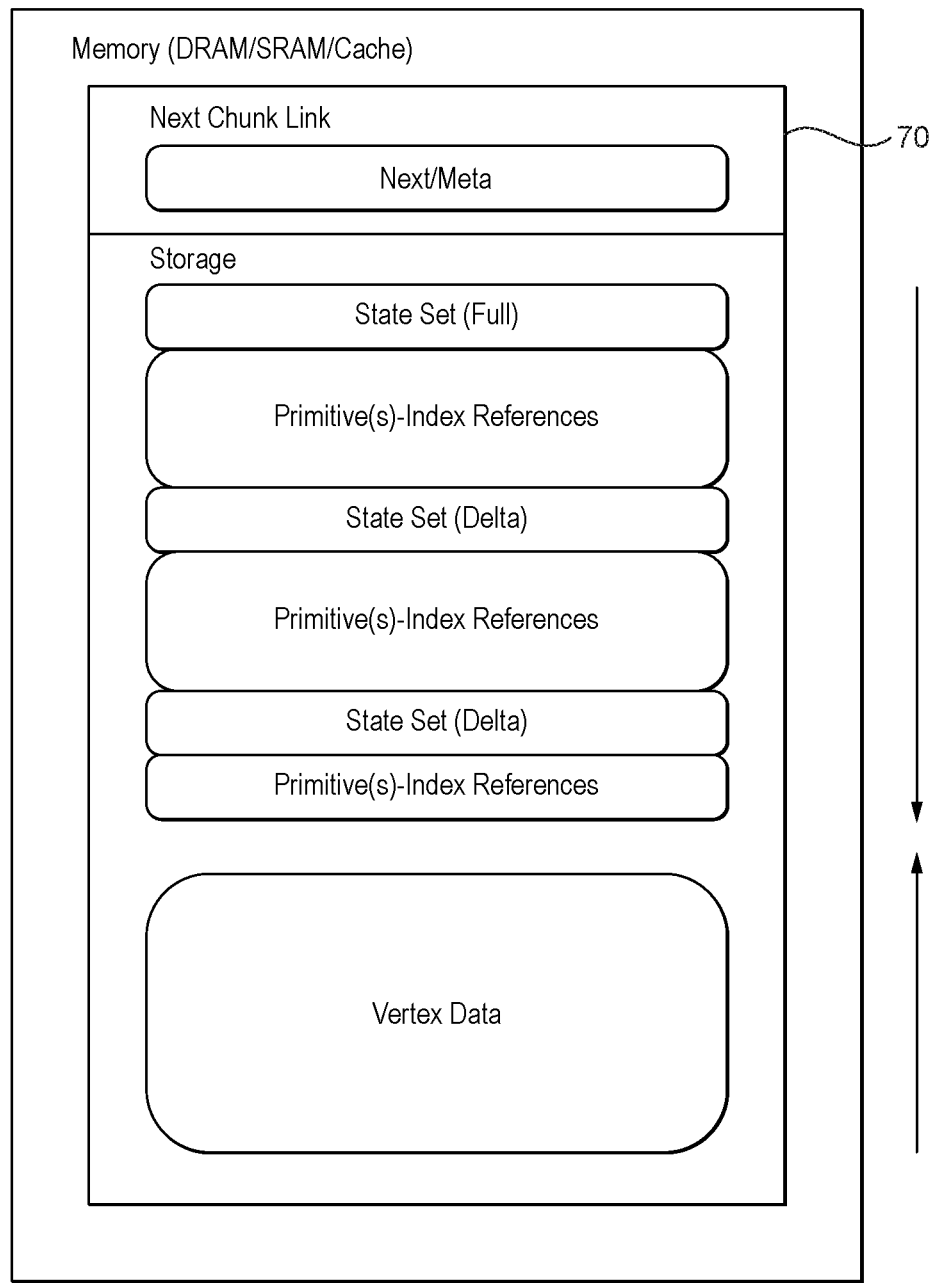
FIG. 7 shows schematically another example of a data structure that may be generated according to an embodiment.

The data structure 60 shown in FIG. 6 may therefore represent a single memory block. As the memory block becomes full, a second memory block can be allocated for the render output region and a link 70 included in the first memory block pointing to the next memory block, and so on, as shown in FIG. 7. The data structure for a particular region may thus comprise a linked list of memory blocks.

Figure 8:
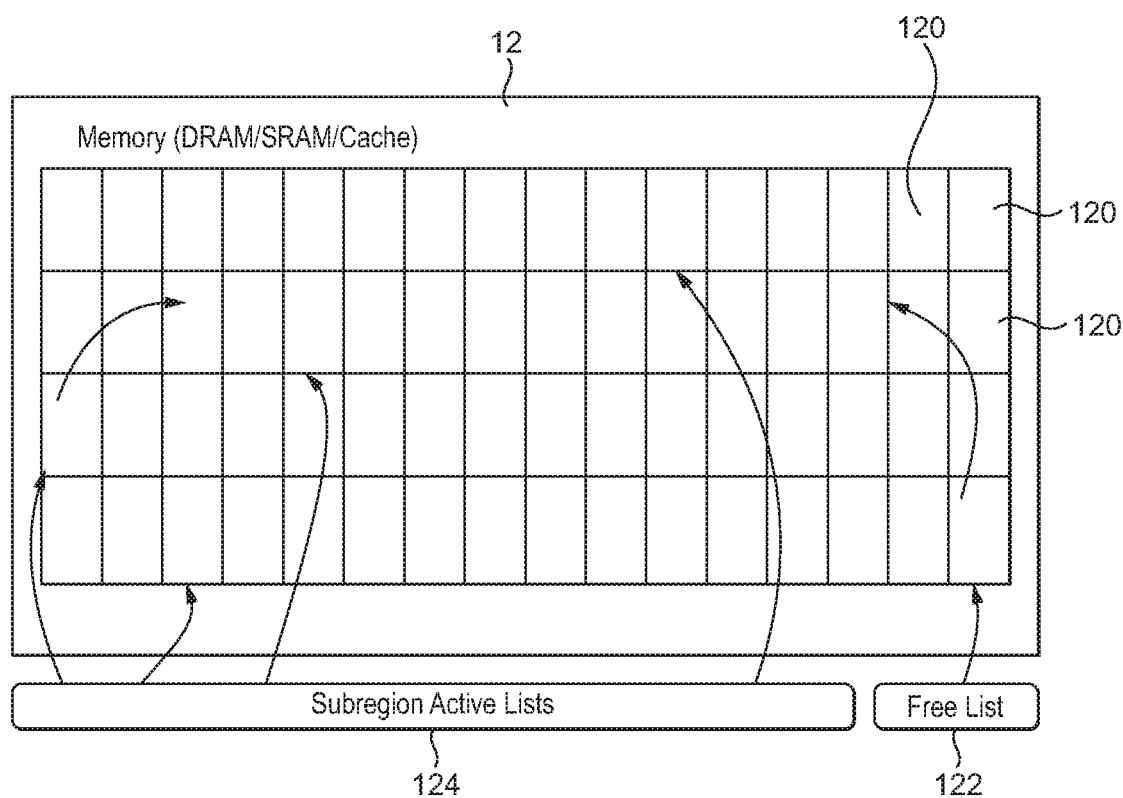
FIG. 8 shows schematically the allocation of memory space according to an embodiment.

The allocation of memory blocks according to the present embodiment is illustrated in FIG. 8. In particular, the memory space 12 comprises a pool of memory blocks 120 that are each initially available to be allocated for data. Initially all of the memory blocks are 'free' to be allocated for data. However, as the memory blocks are allocated for a region, they then become 'active' and are moved from a 'free list' 122 into an 'active list' 124 for the region.

The memory space may have a fixed size (fixed footprint). However, it is also contemplated that the memory space may grow over time. For example, depending on the implementation, more storage may be available at any time, as desired (e.g. to allow fully deferred rendering).

The overall operation of the graphics processing system according to the present embodiments will now be described with reference to FIG. 9.

Figure 9:
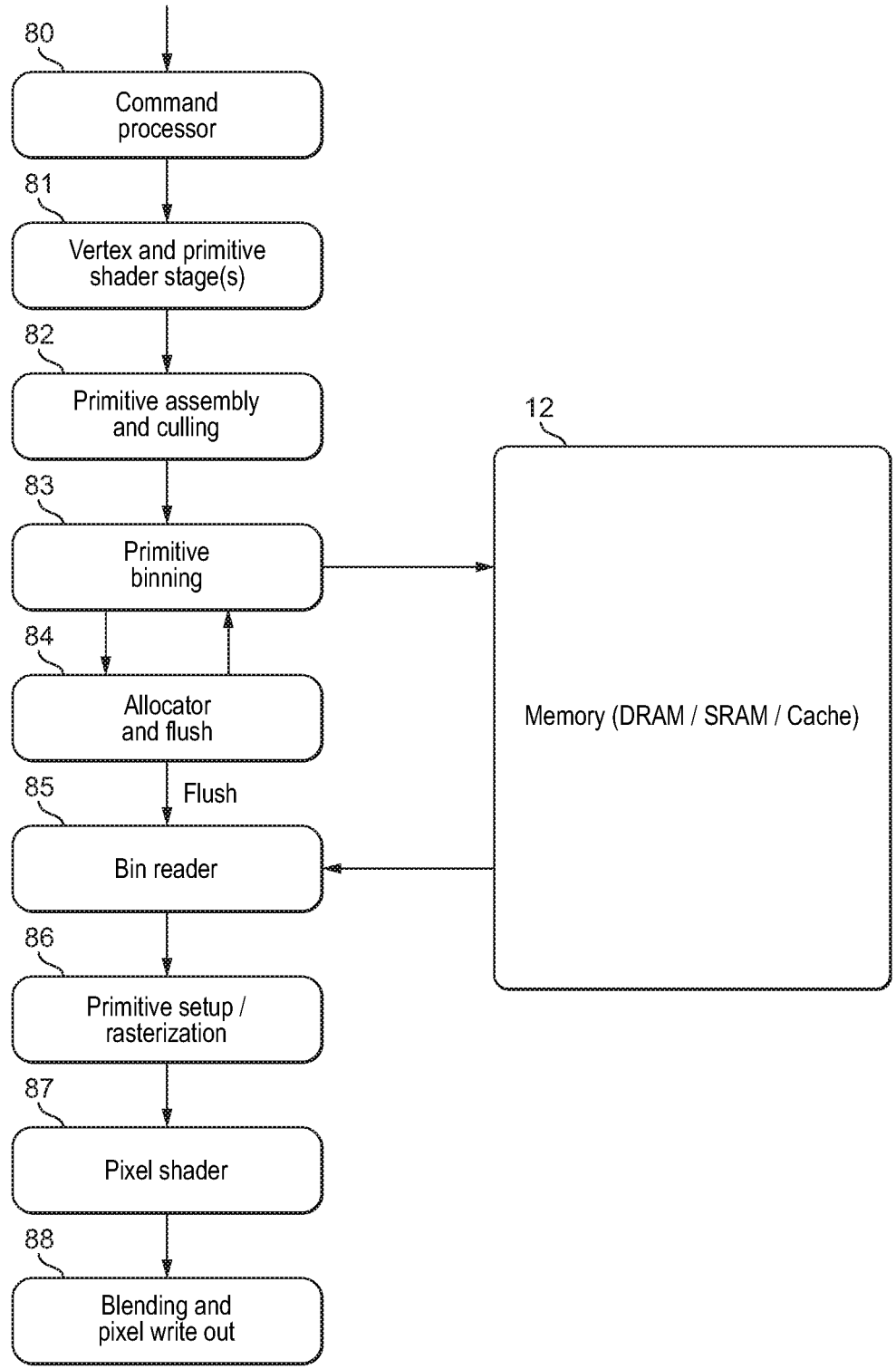
FIG. 9 shows schematically a graphics processing pipeline that a graphics processor may execute according to an embodiment.

FIG. 9 shows an example of a graphics processing pipeline that may be executed on a graphics processor that is communicating with a memory system. The memory system may be a cache, or may comprise a dedicated portion of SRAM or DRAM.

The first stage of the graphics processing pipeline comprises a command processor 80 that receives and processes commands, e.g. from an application requesting the graphics processing operation. The commands may specify, for example, a render output that is to be generated by reference to the primitives that need to be rendered.

Thus, in the next stage, the primitive's vertices are obtained and then processed accordingly, e.g. by shading the vertices and/or primitives in the usual fashion.

After the vertex and primitive shader stage(s) 81, an initial step of primitive assembly and culling 82 may then be performed based on the primitive data.

The primitives are then sorted based on which regions they are to be rendered for and the primitive data is then written into the respective memory data structures appropriately.

Figure 10:
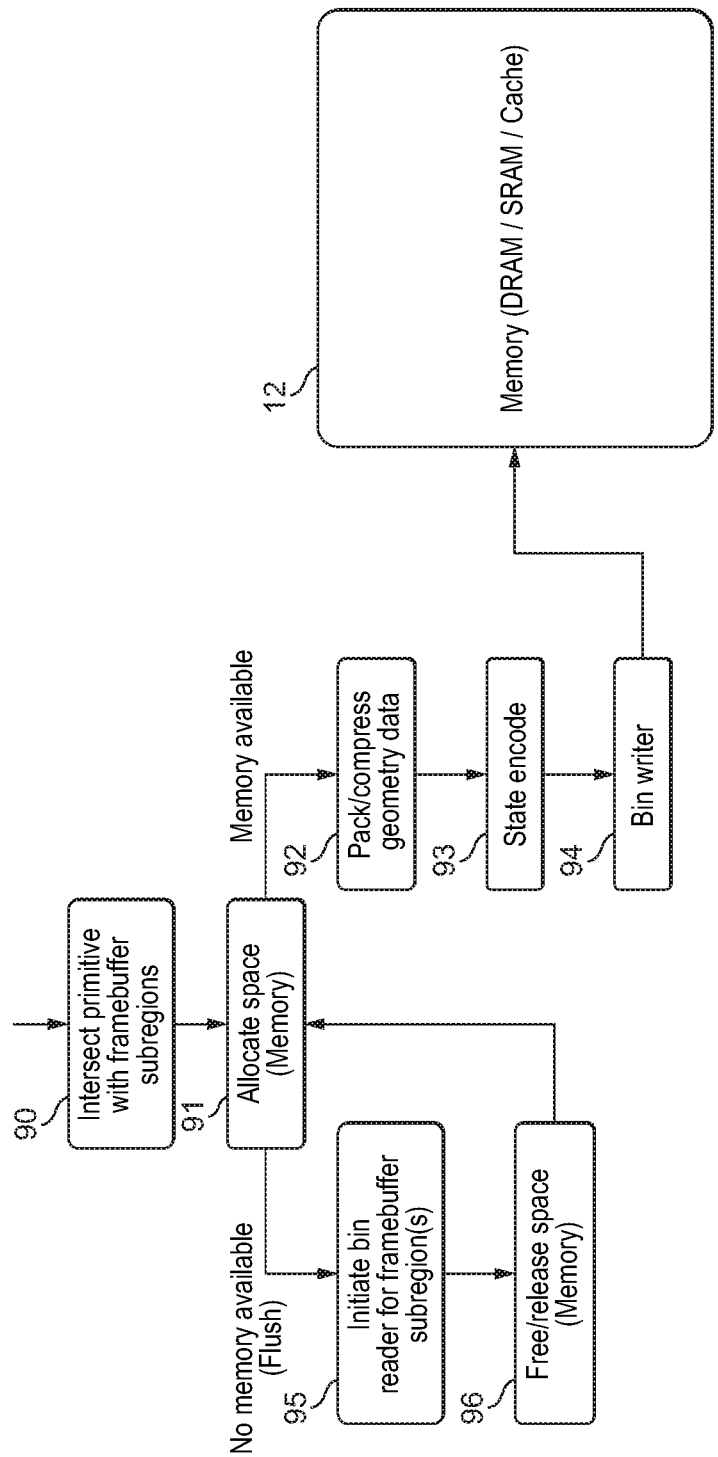
FIG. 10 is a flowchart showing in more detail how primitive data is binned according to an embodiment.

The primitive binning 83 according to the present embodiment is illustrated in more detail in FIG. 10. As shown, for each primitive that is being processed (passing through the graphics processing pipeline), it is first determined which region(s) of the frame buffer the primitive is to be rendered for.

For example, this may be done by intersecting the primitive with the frame buffer regions and determining that the primitive should be rendered for any regions that are at least partially covered by the primitive (step 90). The primitive data should then be written into the respective data structures for each region for which it has been determined that the primitive is to be rendered for.

To do this, an attempt to allocate memory space for the primitive data is made (step 91). If there is sufficient memory available, the primitive data can then be suitably compressed (step 92), any state (control) data encoded appropriately (step 93), and the primitive and state data then written into either an existing data structure for the respective region (if one exists) or into a new data structure generated for the region (if no such data structure exists already) (step 94).

On the other hand, when it is determined that there is no memory space available, or at least that less than a threshold of memory space is available, some of the data that is currently stored is selected to be flushed from the memory.

In particular, one of more frame buffer regions are selected to be flushed, and the bin reader 85 is then initiated to read the data for those regions (step 95).

Figure 11A:
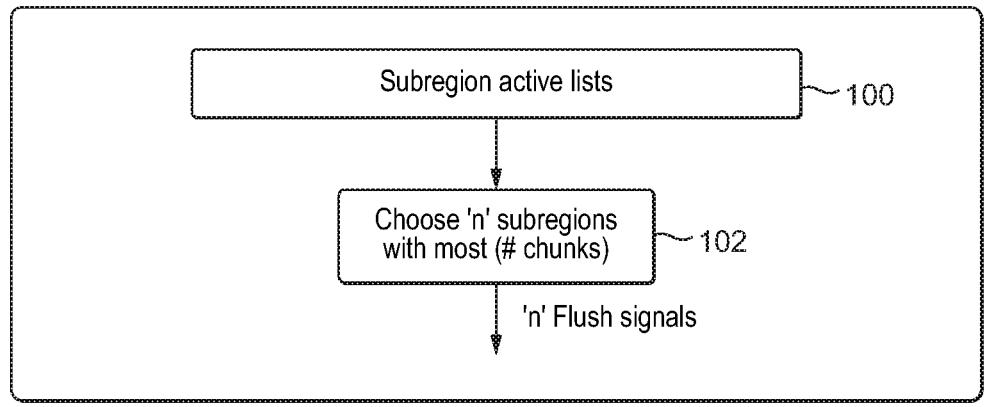
FIGS. 11A and 11B show schematically how data is selected to be written from memory according to various embodiments.
Figure 11B:
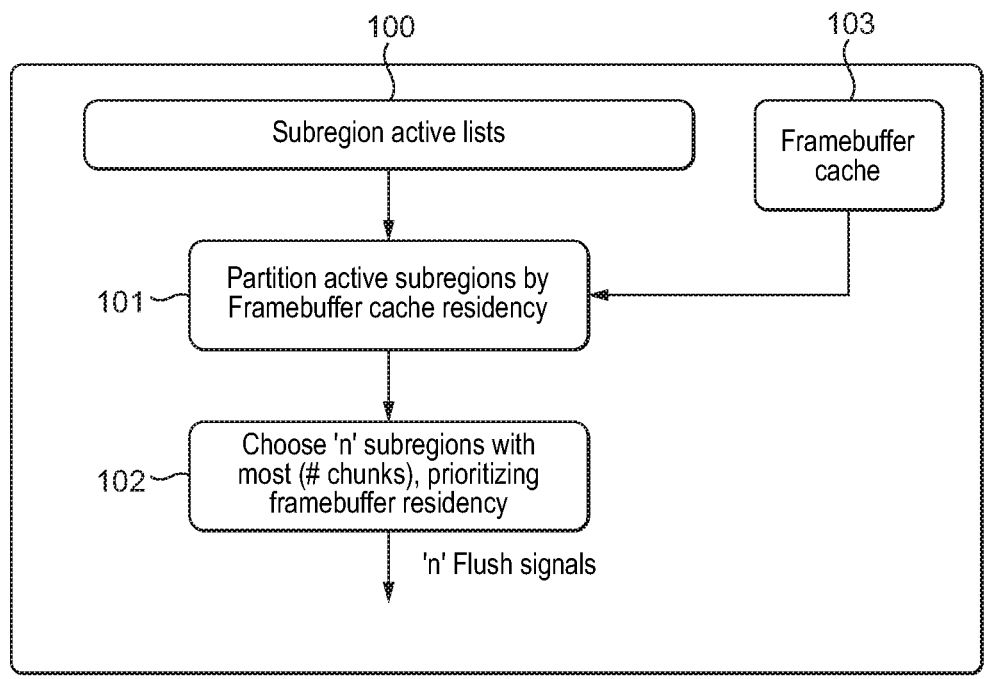

FIGS. 11A and 11B illustrate two possible approaches for selecting which regions should be flushed. In the approach shown in FIG. 11A, the 'n' regions having the greatest number of memory blocks are selected to be flushed (step 100), and a corresponding 'n' flush signals then generated to cause the memory blocks associated with those regions to be flushed from memory and freed up for reallocation for new data (step 102).

In FIG. 11B it is further determined with reference to the render output 103 (e.g. the framebuffer cache) which (if any) regions are currently been, or have previously been, processed, and priority is given to regions that are in the process of being, or have been, at least partially rendered (step 101).

Other arrangements would of course be possible.

Once the data has been read out the corresponding memory blocks can then be released for re-use, in order to free up memory space, which can then be allocated for the new primitive data (step 96).

The data that is read out is then passed to a suitable primitive set up/rasterisation circuit 86, and then onto a pixel shader 87, as appropriate, before being blended and written out into the frame buffer by a suitable blending and pixel write out stage 88.

Figure 12:
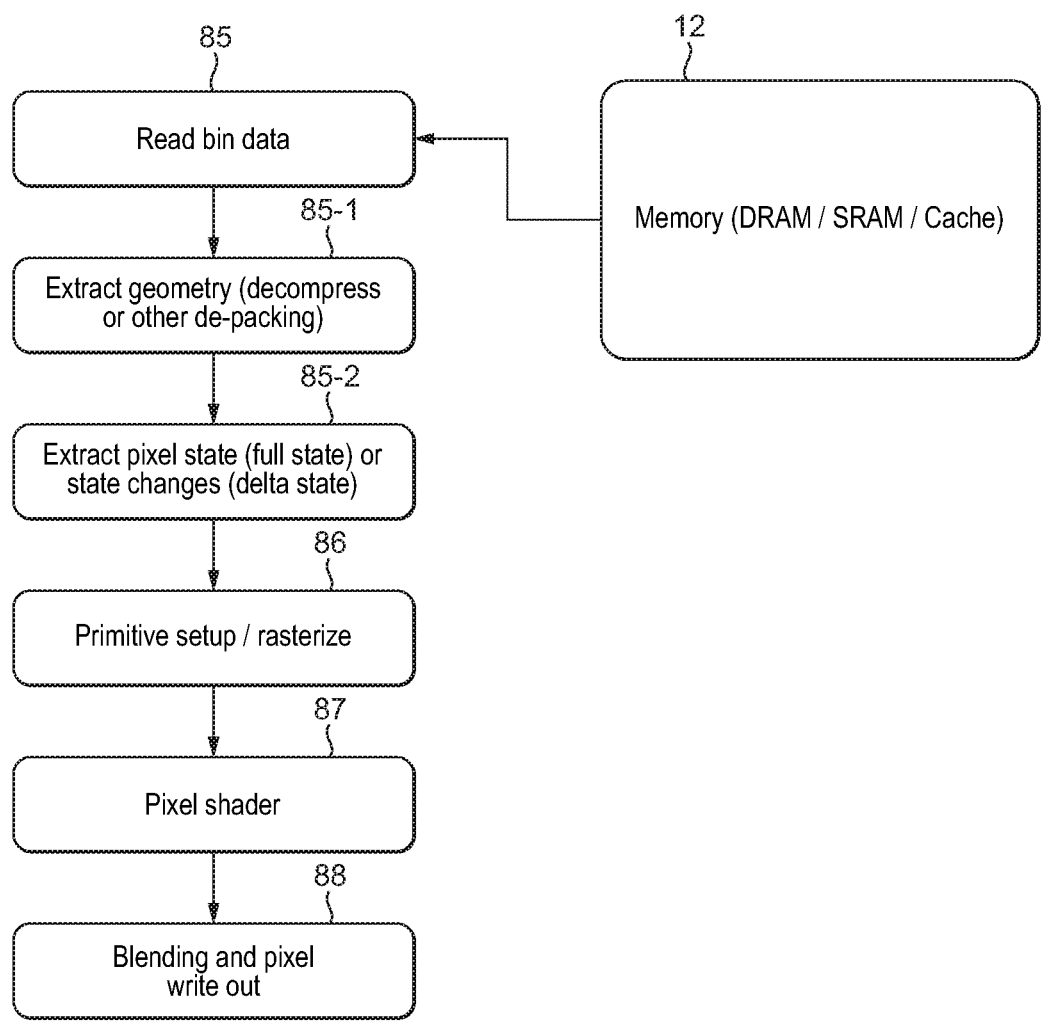
FIG. 12 is a flowchart showing in more detail how data is used according to an embodiment.

This is illustrated in further detail in FIG. 12. As shown in FIG. 12, the data that is read out from memory 12 is processed in order to extract the geometry data (step 85-1), and then to extract the pixel state (step 85-2). The primitive (s) is then rasterised and rendered as described above.

The regions can thus be flushed and the associated data used independently (e.g. as shown in FIG. 5).

Figure 13:
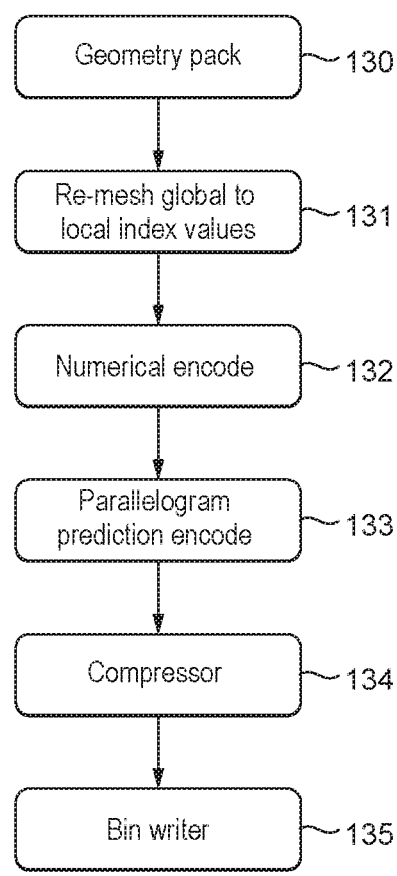
FIGS. 13 to 15 show schematically the compression of data in a data structure for a render output region in embodiments of the technology described herein.
Figure 14:
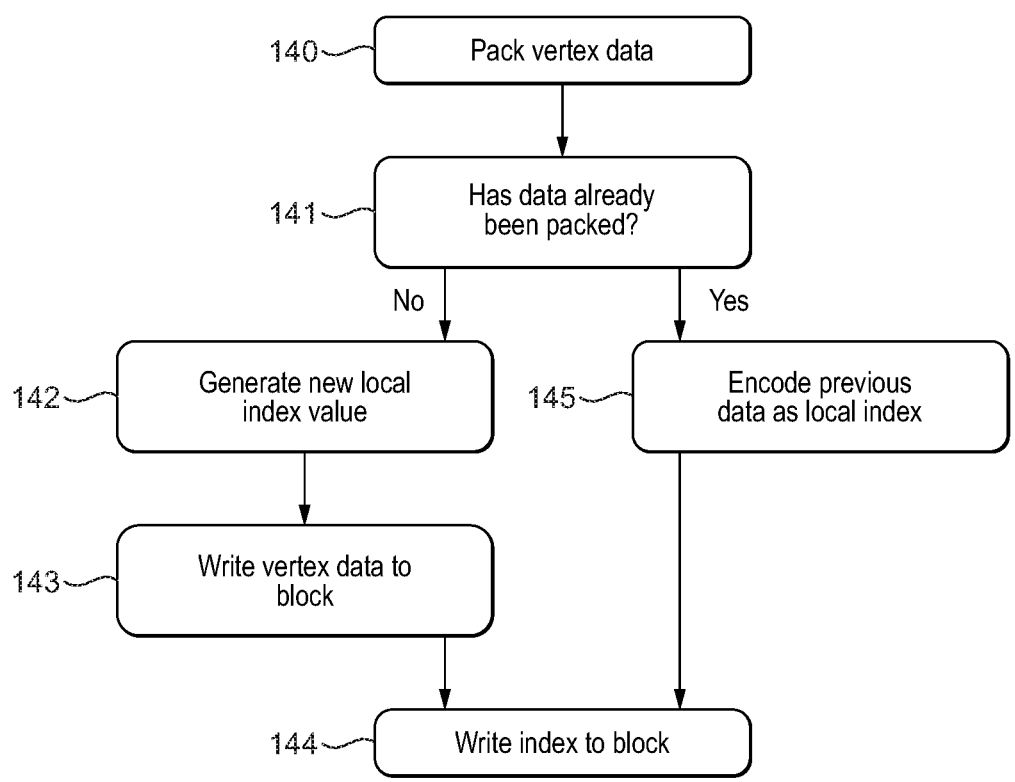
Figure 15:
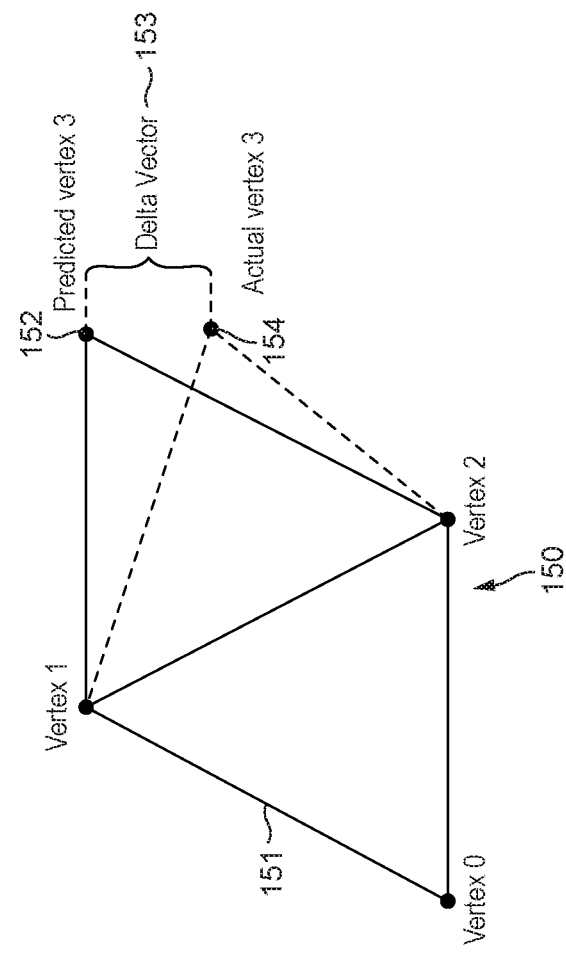
Figure 15:
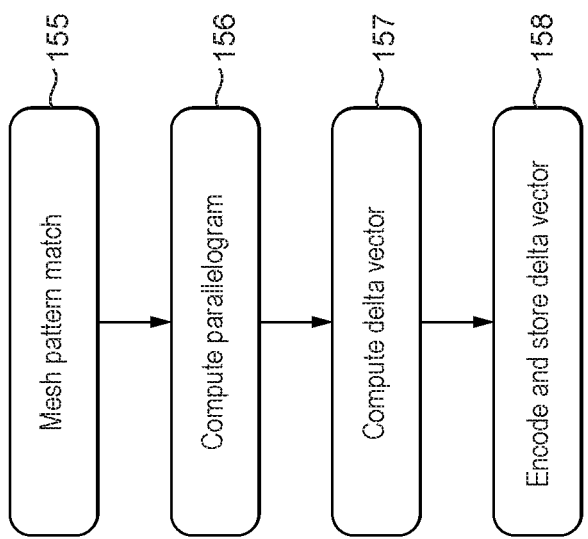

FIGS. 13, 14 and 15 show the compression of the primitive data as it is stored in the data structure for a render output region (so step 92 in FIG. 10) in the present embodiments in more detail. The primitive binning circuit 83 includes appropriate processing circuits (logic) and storage, etc., to perform the appropriate compression and storage of the primitive data in the data structures for the render output regions.

FIG. 13 shows the overall compression process, and FIGS. 14 and 15 show particular aspects of that process.

As shown in FIG. 13, the compression process starts with a step of packing the geometry for the primitive to be added to the data structure for a render output region ready for processing (step 130).

The indices for the vertices for the primitive to be added to the data structure are then re-indexed from the "global" vertex indices that have been allocated to those vertices so as to index those vertices within the set of vertices for the render output as a whole, to corresponding local index values for use within the data structure for the render output region in question only (i.e. to identify the vertices for the primitive within the set of vertices for the data structure for the render output region in question) (step 131).

In the present embodiment, the vertices are indexed locally within the memory block of the data structure (as discussed above in relation to FIG. 7 for example) that they are stored in.

Thus each set of vertices stored in a memory block will be indexed relative to each other within that memory block, but not relative to, or so as to be distinguishable relative to, any vertices in other memory blocks of the data structure for the render output region in question (or vertices in data structures for other render output regions). Thus, where a data structure for a render output region comprises plural memory blocks, the vertices in each memory block will be indexed relative to each other so as to be distinguishable within the memory block in question only. Thus the same set of indices, e.g. starting at "0" and increasing, may be used for each memory block.

FIG. 14 shows this re-indexing operation in more detail.

As shown in FIG. 14, the re-indexing process for a given vertex starts by determining where the vertex data for the vertex in question should be stored (packed) in the memory block (data structure) (step 140).

It is then determined whether the data for the vertex has already been packed in the memory block in question (step 141). (The Applicants have recognised in this regard that primitives for a render output region may share vertices, so it may be that the vertex in question has already been processed for the memory block for the render output region in question for a previous primitive that has been stored in the memory block for the render output region, and so a determination is made as to whether the vertex has already been processed (packed) in the memory block for the render output region.)

This may be determined, e.g., by determining whether the assigned "global" index for the vertex has already been mapped to a "local" index for the memory block in question or not.

When it is determined that the vertex has not already been packed for the memory block for the render output region in question, then a new local "memory block" index value is generated for the vertex in question (step 142), the vertex data for the vertex is written appropriately to the memory block of the data structure for the render output region (step 143) (as will be discussed further below, this comprises compressing the vertex data before it is written to the memory block for the data structure for the render output region), and the newly allocated index value for the vertex is appropriately written to the memory block for the data structure for the render output region in question (step 144).

On the other hand, where it is determined at step 141 that the data for the vertex has already been packed (stored) in the memory block in question (i.e. the same vertex has previously been stored in the particular memory block for the data structure for the render output region in question), then instead of generating a new local index value for writing that vertex data again to the memory block, the vertex is indicated for the primitive in question in the memory block for the render output region data structure in question using, as its local index within the memory block in question, the index that was previously used as the "local" index for the vertex in the memory block, and the vertex data for the vertex is not written to the memory block for the data structure for the render output region (as instead, the "re-used" index will point to the set of that vertex data that is already stored in the memory block in question).

Before writing the vertex data for a vertex to a memory block of a data structure for a render output region (at step 143 in FIG. 14), as shown in FIG. 13, that vertex data is subjected to a numerical encoding process (step 132) and a parallelogram prediction encoding process (step 133).

The numerical encoding process at step 132 can use any one or more desired numerical encoding techniques that reduce the size of the vertex data and/or optimise that data for compression. For example, the x, y position values for the vertices within a data structure could be converted to a shared exponent representation (as that should be more efficient given the localised nature in screen space of all the primitives within the render output region).

Additionally or alternatively, the vertex positions could be represented as difference values relative to a particular, known (predefined) (reference) position for the render output region in question, for example, as a fixed point representation plus a difference (delta) from the defined, reference position. This will then reduce the number of bits needed to store each individual vertex position, as the difference values should be more limited in size. The defined, base (reference) position for a given render output region in an embodiment comprises the defined position for that render output region in the render output, which defined position could, for example, be stored in the data structure for the render output region itself, or could be otherwise determined in use, for example based on which render target output region is being processed.

As shown in FIG. 13, as well as performing some form of numerical encoding of the vertex positions at least as discussed above, in the present embodiment the vertex positions are also encoded using a parallelogram prediction encoding process at step 133. This is illustrated in FIG. 15.

As shown in FIG. 15, this process operates to predict the position of a vertex as the position that completes the parallelogram formed by the vertices of a neighbouring primitive (triangle), and then encodes the vertex position as being the difference (a delta vector) between the predicted vertex position and the actual vertex position.

As shown in FIG. 15, the process starts by determining whether two primitives are suitable for a parallelogram prediction process (step 155). This may comprise, e.g., determining whether the next two triangles to be processed share two vertices or not.

When it is determined that primitives are suitable for parallelogram prediction, then, as shown in FIG. 15, a parallelogram 150 will be computed using the vertices of a first primitive 151 to provide a predicted vertex position 152 (step 156), and then the difference vector 157 between that predicted vertex position 152 and the actual vertex position 154 of a next primitive to be encoded will be computed (step 157), and the difference (delta) vector 153 then stored to represent the position of the vertex 154 for the next primitive (step 158).

Such a prediction process could also be used with primitives other than in the form of individual triangles, for example to encode triangle strips.

As shown in FIG. 13, the so-encoded vertex data and index values are then subjected to a compression scheme, such as entropy encoding compression process (step 134), before then being written to the (memory block for the) data structure for the render output region in question (step 135) (steps 143 and 144 in FIG. 14).

It will be appreciated in this regard that the re-indexing, numerical encoding and parallelogram prediction encoding all serve to condition and optimise the geometry data for the primitives that is to be stored in the data structure (memory block) for the render output region for the compression process at step 134, thereby further enhancing the compression of that data.

When the data structure for a render output region is read out from the memory by the bin reader 85 for processing, then as shown in FIG. 12, the extraction of the geometry data (step 85-1) and the extraction of the pixel state (step 85-2) is performed in an appropriate manner to extract and convert that data to an appropriate form for processing by the graphics processor (and in particular for the primitive setup/rasterise stage (circuit) 86 and the pixel shading stage (circuit) 87).

Thus, the bin reader 85 and the bin reading process will operate to decompress any compressed, e.g. vertex data, that is extracted from the data structure (step 85-1), and then, where appropriate, further convert that data from its relative (differential) encoding representation to actual data values that may be required for processing the primitives. Correspondingly, the extracted "local" vertex indices defining the vertices to be used for the primitives will be used "as is" to identify the corresponding vertex data stored in the data structure that needs to be processed for the vertices for the primitive in question.

Thus, in the present embodiment, where the data has been compressed as discussed above, the read-out data from the memory block of the data structure in question will first be subjected to the appropriate decompression process to decompress that data.

The decompressed vertex indices will then be used to identify the vertices and the stored vertex data to use when rendering a primitive.

The "full" vertex data, e.g. vertex positions, will then be recreated by adding the respective difference value or values to the predicted and base values, before then being used by the graphics processor to process that data.

Correspondingly, when extracting the state data (step 85-2), any differentially encoded state data will be appropriately recreated by adding the difference value stored in the memory block for the data structure for the render output region to the appropriate base state data value.

The bin reader circuit 85 includes appropriate decoding/decompression circuits, storage, etc., to perform this processing as required, in order to extract the geometry and state data and provide that in a form that is suitable for processing by the graphics processor.

Although the present embodiments have been described primarily with reference to the processing of the primitives, and the storing of associated geometry data, etc., for primitives individually, the technology described herein could also be used correspondingly for a set (and for respective sets) of plural primitives (which may, e.g., comprise a mesh/strip of primitives), e.g. to be processed together, e.g. with geometry then being stored (in a compressed form) for the set(s) of plural primitives. Various arrangements would be possible in this regard. Thus, in general, the processing may comprise processing a set of one or more primitive(s).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of processing graphics primitives using a graphics processing system comprising a memory and a graphics processor in communication with the memory, wherein the graphics processor is configured to generate a render output by rendering a plurality of primitives for the render output, wherein each primitive is rendered by the graphics processor using associated primitive data including geometry data representing the primitive, the method comprising:

dividing the render output into a plurality of regions for rendering, each region comprising a respective area of the render output; and for a set of one or more primitive(s) that is to be rendered:
obtaining associated geometry data for rendering the set of one or more primitive(s);
determining for which of the plurality of regions of the render output the set of one or more primitive(s) should be rendered; and
for each region of the render output it is determined the set of one or more primitive(s) should be rendered for, storing the geometry data for the set of one or more primitive(s) in memory in a respective data structure for the region,
such that the geometry data for the set of one or more primitive(s) to be rendered is stored in a respective, different data structure for each different region of the render output it is determined the set of one or more primitive(s) should be rendered for;

wherein the storing the geometry data for the set of one or more primitive(s) in a respective data structure for a region of the render output comprises:
storing geometry data for the set of one or more primitive(s) in a respective data structure for the region of the render output in a compressed form, wherein the geometry data comprises a set of vertex indices identifying vertices to be used for the set of one or more primitive(s), and that vertex index data is compressed by re-indexing the vertices from their initially defined indices to a new set of indices that indexes the vertices within the data structure for the render output region.

2. The method of claim 1, wherein the geometry data that is stored in a compressed form for a set of one or more primitive(s) comprises at least one of:
a set of vertex indices identifying vertices to be used for the set of one or more primitive(s); and
a set of vertex attribute data for each vertex for the set of one or more primitive(s).

3. The method of claim 1, wherein the geometry data is compressed by converting that data to a different representation before storing that data in the data structure for a render output region.

4. The method of claim 1, wherein the geometry data is compressed by applying a compression scheme to that data.

5. The method of claim 1, comprising:
determining whether data for a vertex for a set of one or more primitive(s) has already been stored in the data structure for a render output region;
and when it is determined that the vertex data for a vertex has already been stored in the data structure for a render output region:
using the index for that previously stored vertex data as the index for the vertex for the set of one or more primitive(s).

6. The method of claim 1, wherein the geometry data that is compressed comprises vertex data, and that vertex data is compressed by representing the vertex data as a set of one or more difference values relative to another value or values.

7. The method of claim 6, wherein the another value or values that the vertex data is represented relative to comprises:
a reference data value or values for the render output region and/or a predicted value or values for the vertex.

8. The method of claim 1, further comprising for a set of one or more primitive(s) that is to be rendered:
for each region of the render output it is determined the set of one or more primitive(s) should be rendered for, storing an indication of state data that is to be used for rendering the set of one or more primitive(s) along with the geometry data for the set of one or more primitive(s) in memory in a respective data structure for the region, such that the geometry data and an indication of state data for the set of one or more primitive(s) to be rendered is stored in a respective, different data structure for each different region of the render output it is determined the set of one or more primitive(s) should be rendered for;
wherein the storing the indication of state data for the set of one or more primitive(s) in a respective data structure for a region of the render output comprises:
storing the indication of state data for the set of one or more primitive(s) in a respective data structure for the region of the render output in a compressed form.

9. The method of claim 8, comprising compressing the state data for a set of one or more primitive(s) by representing the state data as a set of one or more difference values relative to a base state data value or values for the render output region.

10. A graphics processing system comprising a memory and a graphics processor in communication with the memory, wherein the graphics processor is configured to generate a render output by rendering a plurality of primitives for the render output, wherein each primitive is rendered by the graphics processor using associated primitive data including geometry data representing the primitive, the graphics processor comprising:
a primitive sorting circuit that is configured to:
for a set of one or more primitive(s) that is to be processed:
obtain associated geometry data for rendering the set of one or more primitive(s);
determine for which region(s) of a plurality of regions that the render output has been divided into for rendering purposes, each region comprising a respective area of the render output, the set of one or more primitive(s) should be rendered; and
a primitive data storing circuit, configured to:
for each region of a render output it is determined by the primitive sorting circuit that a set of one or more primitive(s) should be rendered for, store the geometry data for the primitive in the memory in a respective data structure for the region, such that the geometry data for a set of one or more primitive(s) to be rendered is stored in a respective, different data structure for each different region of the render output it is determined the set of one or more primitive(s) should be rendered for;
wherein the primitive data storing circuit is configured to store geometry data for a set of one or more primitive(s) in a respective data structure for a region of the render output in a compressed form; and
wherein the geometry data comprises a set of vertex indices identifying vertices to be used for the set of one or more primitive(s), and that vertex index data is compressed by re-indexing the vertices from their initially defined indices to a new set of indices that indexes the vertices within the data structure for the render output region.

11. The system of claim 10, wherein the geometry data that is stored in a compressed form for a set of one or more primitive(s) comprises at least one of:
a set of vertex indices identifying vertices to be used for the set of one or more primitive(s); and
a set of vertex attribute data for each vertex for the set of one or more primitive(s).

12. The system of claim 10, wherein the geometry data is compressed by converting that data to a different representation before storing that data in the data structure for a render output region.

13. The system of claim 10, wherein the geometry data is compressed by applying a compression scheme to that data.

14. The system of claim 10, wherein the primitive data storing circuit is configured to: determine whether data for a vertex for a set of one or more primitive(s) has already been stored in the data structure for a render output region; and when it is determined that the vertex data for a vertex has already been stored in the data structure for a render output region: use the index for that previously stored vertex data as the index for the vertex for the set of one or more primitive(s).

15. The system of claim 10, wherein the geometry data that is compressed comprises vertex data, and that vertex data is compressed by representing the vertex data as a set of one or more difference values relative to another value or values.

16. The system of claim 15, wherein the another value or values that the vertex data is represented relative to comprises:
a reference data value or values for the render output region and/or a predicted value or values for the vertex.

17. The system of claim 10, wherein the primitive data storing circuit is configured to, for a set of one or more primitive(s) that is to be rendered:
for each region of the render output it is determined the set of one or more primitive(s) should be rendered for, store an indication of state data that is to be used for rendering the set of one or more primitive(s) along with the geometry data for the set of one or more primitive(s) in memory in a respective data structure for the region, such that the geometry data and an indication of state data for the set of one or more primitive(s) to be rendered is stored in a respective, different data structure for each different region of the render output it is determined the set of one or more primitive(s) should be rendered for;
wherein the storing the indication of state data for the set of one or more primitive(s) in a respective data structure for a region of the render output comprises:

storing the indication of state data for the set of one or more primitive(s) in a respective data structure for the region of the render output in a compressed form.

18. The system of claim 17, wherein the primitive data storing circuit is configured to compress the state data for a set of one of more primitive(s) by representing the state data as a set of one or more difference values relative to a base state data value or values for the render output region.

19. A non-transitory computer readable storage medium storing software code that when executing on a processor performs a method of processing graphics primitives using a graphics processing system comprising a memory and a graphics processor in communication with the memory, wherein the graphics processor is configured to generate a render output by rendering a plurality of primitives for the render output, wherein each primitive is rendered by the graphics processor using associated primitive data including geometry data representing the primitive, the method comprising:

dividing the render output into a plurality of regions for rendering, each region comprising a respective area of the render output; and for a set of one or more primitive(s) that is to be rendered:

obtaining associated geometry data for rendering the set of one or more primitive(s);

determining for which of the plurality of regions of the render output the set of one or more primitive(s) should be rendered; and for each region of the render output it is determined the set of one or more primitive(s) should be rendered for, storing the geometry data for the set of one or more primitive(s) in memory in a respective data structure for the region, such that the geometry data for the set of one or more primitive(s) to be rendered is stored in a respective, different data structure for each different region of the render output it is determined the set of one or more primitive(s) should be rendered for;

wherein the storing the geometry data for the set of one or more primitive(s) in a respective data structure for a region of the render output comprises:

storing geometry data for the set of one or more primitive(s) in a respective data structure for the region of the render output in a compressed form;

wherein the geometry data comprises a set of vertex indices identifying vertices to be used for the set of one or more primitive(s), and that vertex index data is compressed by re-indexing the vertices from their initially defined indices to a new set of indices that indexes the vertices within the data structure for the render output region.

* * * * *